(12) United States Patent
Zhang et al.

(10) Patent No.: US 11,048,614 B2
(45) Date of Patent: *Jun. 29, 2021

(54) IMMERSIVE WEB-BASED SIMULATOR FOR DIGITAL ASSISTANT-BASED APPLICATIONS

(71) Applicant: GOOGLE LLC, Mountain View, CA (US)

(72) Inventors: Xiongqi Zhang, Mountain View, CA (US); Xiao Wei, Redwood, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/889,475

(22) Filed: Jun. 1, 2020

(65) Prior Publication Data

US 2020/0293428 A1 Sep. 17, 2020

Related U.S. Application Data

(63) Continuation of application No. 16/466,235, filed as application No. PCT/US2019/029836 on Apr. 30, 2019.

(60) Provisional application No. 62/668,237, filed on May 7, 2018.

(51) Int. Cl.
*G06F 11/36* (2006.01)
*G06F 8/34* (2018.01)
*G06F 8/33* (2018.01)

(52) U.S. Cl.
CPC ............ *G06F 11/3612* (2013.01); *G06F 8/33* (2013.01); *G06F 8/34* (2013.01); *G06F 11/3644* (2013.01); *G06F 11/3664* (2013.01)

(58) Field of Classification Search
CPC ............ G06F 11/3664; G06F 11/3612; G06F 11/3644; G06F 8/33; G06F 8/34
USPC ................................................. 717/100–161
See application file for complete search history.

(56) References Cited

U.S. PATENT DOCUMENTS

| | | | |
|---|---|---|---|
| 6,832,184 B1 * | 12/2004 | Bleier, Jr. ............... | H04L 43/50 702/182 |
| 7,958,453 B1 | 6/2011 | Taing | |
| 8,490,117 B1 * | 7/2013 | Brichford ........... | G06F 9/45512 719/328 |
| 8,788,885 B1 * | 7/2014 | Cook .................. | G06F 11/3668 714/38.1 |

(Continued)

OTHER PUBLICATIONS

International Search Report and Written Opinion for PCT Appln. Ser. No. PCT/US2019/029836 dated Aug. 30, 2019 (13 pages).

(Continued)

*Primary Examiner* — Marina Lee
(74) *Attorney, Agent, or Firm* — Foley & Lardner LLP

(57) ABSTRACT

Immersive web-based simulator for digital assistant-based applications is provided. A system can provide, for display in a web browser, an inner iframe configured to load, in a secure, access restricted computing environment, an application configured to integrate with a digital assistant. The application can be provided by a third-party developer device. The system can provide, for display in a web browser, an outer iframe configured with a two-way communication protocol to communicate with the inner iframe. The system can provide a state machine to identify a current state of the application loaded in the inner frame, and load a next state of the application responsive to a control input.

20 Claims, 8 Drawing Sheets

(56) References Cited

U.S. PATENT DOCUMENTS

| | | | | |
|---|---|---|---|---|
| 9,009,834 | B1* | 4/2015 | Ren | G06F 21/6209 |
| | | | | 726/24 |
| 9,372,836 | B2* | 6/2016 | Reshadi | G06F 16/986 |
| 9,405,660 | B2* | 8/2016 | Cook | G06F 11/3692 |
| 9,923,793 | B1* | 3/2018 | Gore | H04L 67/42 |
| 10,095,609 | B1* | 10/2018 | Cook | G06F 11/2294 |
| 10,679,244 | B1* | 6/2020 | Bhowmick | G06Q 30/0248 |
| 2010/0131346 | A1* | 5/2010 | Morgan | G06Q 30/0601 |
| | | | | 705/14.25 |
| 2013/0104028 | A1* | 4/2013 | Murray | G06F 15/0291 |
| | | | | 715/234 |
| 2013/0159169 | A1* | 6/2013 | Schneeman | G06Q 20/12 |
| | | | | 705/39 |
| 2014/0047413 | A1* | 2/2014 | Sheive | G06F 8/30 |
| | | | | 717/110 |
| 2014/0298298 | A1* | 10/2014 | Cook | G06F 11/2294 |
| | | | | 717/125 |
| 2014/0317489 | A1* | 10/2014 | Lal | G06F 40/14 |
| | | | | 715/234 |
| 2017/0017380 | A1* | 1/2017 | Mehrotra | H04W 4/18 |
| 2017/0185251 | A1* | 6/2017 | Jain | G06F 3/0481 |
| 2017/0262885 | A1* | 9/2017 | Fuentes | G06Q 30/0269 |
| 2019/0012216 | A1* | 1/2019 | Pennell | H04L 69/08 |
| 2019/0251959 | A1 | 8/2019 | Engles et al. | |
| 2020/0218762 | A1* | 7/2020 | Jain | G06Q 30/0641 |
| 2020/0293428 | A1 | 9/2020 | Zhang et al. | |

OTHER PUBLICATIONS

Decision to Grant for EP Appln. Ser. No. 19723586.4 dated Oct. 15, 2020 (2 pages).

Intention to Grant for EP Appln. Ser. No. 19723586.4 dated May 25, 2020 (76 pages).

Non-Final Office Action for U.S. Appl. No. 16/466,235 dated Dec. 10, 2020 (8 pages).

* cited by examiner

IMMERSIVE WEB-BASED SIMULATOR FOR DIGITAL ASSISTANT-BASED APPLICATIONS

CROSS-REFERENCES TO RELATED APPLICATIONS

This application claims the benefit of priority under 35 U.S.C. § 120 as a continuation of U.S. patent application Ser. No. 16/466,235, filed Jun. 3, 2019, which is a U.S. National Stage under 35 U.S.C. § 371 of International Patent Application No. PCT/US2019/029836, filed on Apr. 30, 2019 and designating the United States, which claims the benefit of priority under 35 U.S.C. § 119 to U.S. Provisional Patent Application No. 62/668,237, filed May 7, 2018, each of which is hereby incorporated by reference herein in its entirety.

BACKGROUND

Applications can be developed by a developer. As applications become increasingly complex due to sophisticated features or multiple interactions, it can be difficult identify errors or malfunctions, and remedy such errors or malfunctions.

SUMMARY

At least one aspect is directed to a system to detect errors in digital assistant-based applications. The system can include a data processing system having one or more processors. The data processing system can identify an application package file for an application. The application can interface with a digital assistant via audio signals. The application can be provided by an application developer. The data processing system can receive, from a device of the application developer, a transcript file for the application. The data processing system can establish, in a web browser executed by the device of the application developer, a first iframe of a simulator component for digital assistant-based applications. The simulator component can establish a plurality of iframes within the first iframe that communicate between the plurality of iframes via a two-way communication protocol. The data processing system can provide, for display in the web browser executed by the device of the application developer, a second iframe within the first iframe to load a control setting for the simulator component. The data processing system can provide, for display in the web browser, a third iframe within the first iframe to display output of the simulator component. The data processing system can provide, for display in the web browser, a fourth iframe within the first iframe that executes a state machine to generate a query based on the transcript file and responsive to the control setting established in the second iframe. The simulator component can provide, from the fourth iframe, the query for display via the web browser. The simulator component can receive, responsive to the query, an input. The simulator component can update a state of the state machine responsive to the query and the input to generate an application output for display via the third iframe. The simulator component can identify, based on a second query generated by the state machine responsive to the input, an error with the application. The simulator component can terminate, responsive to the error, at least one of the plurality of iframes established by the simulator component.

The fourth iframe may have restricted access to computing resources of the device of the application developer. The data processing system may be configured to execute the state machine provided via the fourth iframe. The data processing system may be configured to: receive an audio signal responsive to the query displayed by the simulator component; and provide the audio signal as the input to the state machine of the fourth iframe. The application may be built by the application developer via a digital assistant application engine provided by the data processing system. The data processing system may be configured to load, in the second iframe, the control setting comprising at least one of a surface, a language, or a location. The data processing system may be configured to receive, from the device of the application developer, an HTML file comprising the transcript file. The data processing system may be configured to simulate one or more features of the application and provide a dynamic, real-time interface via at least one of the plurality of iframes. The data processing system may be configured to: receive, via the control setting of the second iframe, a selection of a surface from a plurality of surfaces; and generate the query based on a policy or characteristic for the surface selected via the second iframe. The data processing system may be configured to generate an alert indicating the error associated with the application simulated via the simulator component. The data processing system may be configured to block, responsive to the error, further communication between at least two of the plurality of iframes established by the simulator component. The data processing system may be configured to refresh, responsive to the error, at least one of the plurality of iframes established by the simulator component. The data processing system may be configured to: remove, responsive to the error, at least one of the plurality of iframes; and establish a new instance of the at least one of the plurality of iframes previously removed.

At least one aspect is directed to a method of detecting errors in digital assistant-based applications. The method can be performed by a data processing system having one or more processors. The method can include the data processing system identifying an application package file for an application. The application can interface with a digital assistant via audio signals. The application can be provided by an application developer. The method can include the data processing system receiving, from a device of the application developer, a transcript file for the application. The method can include the data processing system establishing, in a web browser executed by the device of the application developer, a first iframe of a simulator component for digital assistant-based applications. The method can include the simulator component establishing a plurality of iframes within the first iframe that communicate between the plurality of iframes via a two-way communication protocol (or bi-directional communication). The method can include the data processing system providing, for display in the web browser executed by the device of the application developer, a second iframe within the first iframe to load a control setting for the simulator component. The method can include the data processing system providing, for display in the web browser, a third iframe within the first iframe to display output of the simulator component. The method can include the data processing system providing, for display in the web browser, a fourth iframe within the first iframe that executes a state machine to generate a query based on the transcript file and responsive to the control setting established in the second iframe. The method can include the simulator component providing, from the fourth iframe, the query for display via the web browser. The method can include the simulator component receiving, responsive to the query, an input. The method can include the simulator component updating a state of the state machine responsive to the query and the input to generate an application output for display via the third iframe. The method can include the simulator component identifying, based on a second query generated by the state machine responsive to the input, an error with the application. The method can include the simulator component terminating, responsive to the error, at least one of the plurality of iframes established by the simulator component.

The method may further comprise restricting access of the fourth iframe to computing resources of the device of the application developer. The method may further comprise executing, by the data processing system, the state machine provided via the fourth iframe. The method may further comprise: receiving an audio signal responsive to the query displayed by the simulator component; and providing the audio signal as the input to the state machine of the fourth iframe. The method may further comprise providing, by the data processing system for loading in the second iframe, the control setting comprising at least one of a surface, a language, or a location. The method may further comprise: receiving, by the data processing system via the control setting of the second iframe, a selection of a surface from a plurality of surfaces; and generating the query based on a policy or characteristic for the surface selected via the second iframe. The method may further comprise removing, responsive to the error, at least one of the plurality of iframes; and establishing a new instance of the at least one of the plurality of iframes previously removed. The method may further comprise providing, by the data processing system, a digital assistant application engine for use in building the application. The method may further comprise receiving, by the data processing system, from the device of the application developer, an HTML file comprising the transcript file. The method may further comprise: simulating, by the data processing system, one or more features of the application; and providing, by the data processing system, an interface to the simulated application via at least one of the plurality of iframes. The method may further comprise generating, by the data processing system, an alert indicating the error associated with the application simulated via the simulator component. The method may further comprise blocking, responsive to the error, further communication between at least two of the plurality of iframes.

At least one aspect is directed to a system to simulate digital assistant-based applications. The system can include a data processing system having one or more processors. The data processing system can provide, for display in a web browser, an inner iframe. The inner iframe can be configured to load, in a secure, access restricted computing environment, an application. The application can be configured to integrate with a digital assistant. The application can be provided by a third-party developer device. The data processing system can provide, for display in a web browser, an outer iframe configured with a two-way communication protocol to communicate with the inner iframe. The data processing system can provide a state machine to identify a current state of the application loaded in the inner frame, and load a next state of the application responsive to a control input.

At least one aspect is directed to a method of simulating digital assistant-based applications. The method can be performed by a data processing system having one or more processors. The method can include the data processing system providing, for display in a web browser, an inner iframe. The inner iframe can be configured to load, in a secure, access restricted computing environment, an application. The application can be configured to integrate with a digital assistant. The application can be provided by a third-party developer device. The method can include the data processing system providing, for display in a web browser, an outer iframe configured with a two-way communication protocol to communicate with the inner iframe. The method can include the data processing system providing a state machine to identify a current state of the application loaded in the inner frame, and load a next state of the application responsive to a control input.

A further aspect is directed to a computer-readable medium comprising instructions that, when executed by a computer, cause the computer to perform any of the methods disclosed herein. Another aspect is directed to a computer program comprising instructions that, when executed by a computer, cause the computer to perform any of the methods disclosed herein.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
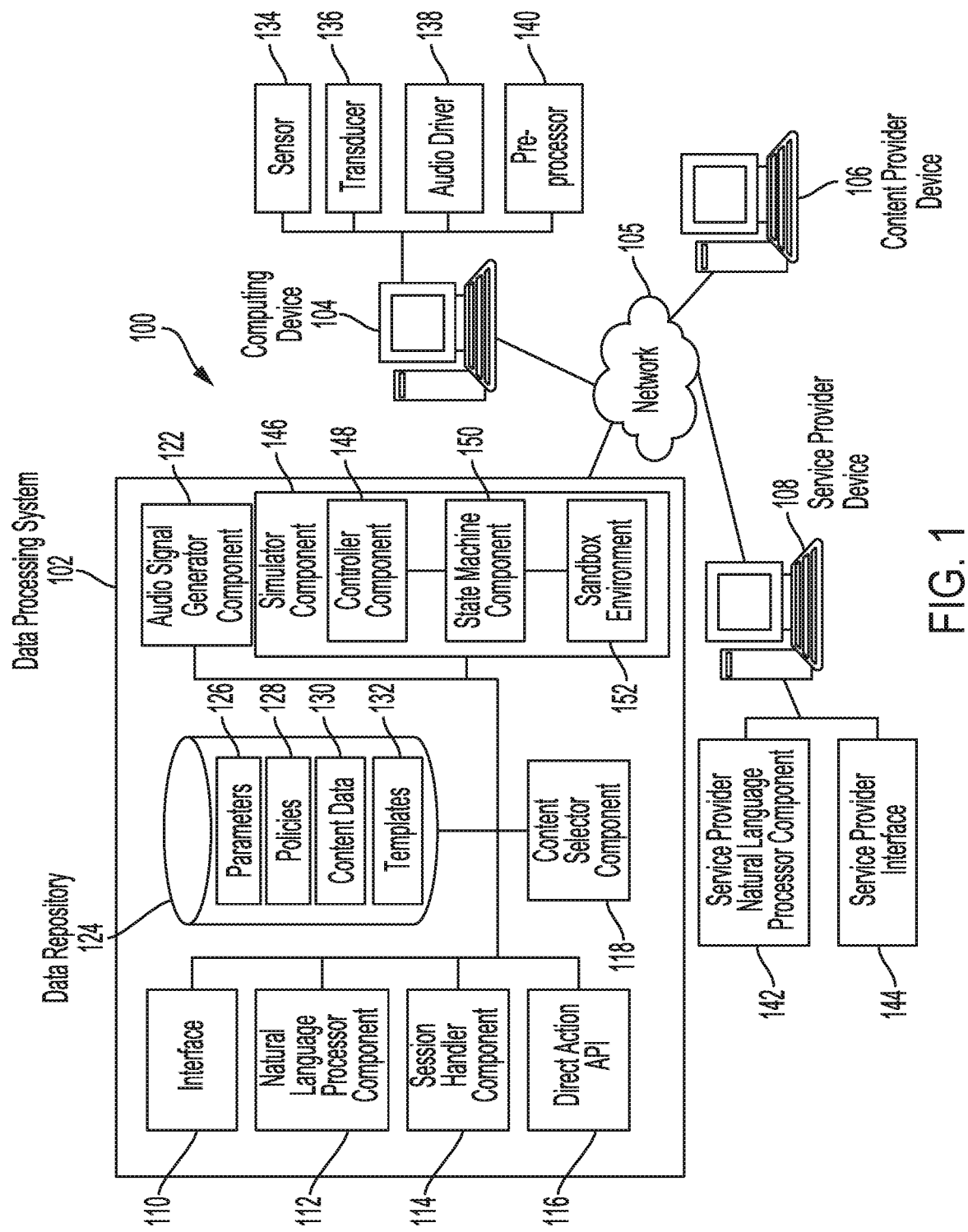
FIG. 1 is an illustration of an example system to simulate digital assistant-based applications.

Following below are more detailed descriptions of various concepts related to, and implementations of, methods, apparatuses, and systems of simulating, debugging, or detecting errors in digital assistant-based applications. The various concepts introduced above and discussed in greater detail below may be implemented in any of numerous ways.

The present disclosure is generally directed to an immersive web-based simulator or simulation tool for digital assistant-based application. Systems and methods of the present technical solution can provide a web-based simulation tool that allows a developer to load their application content. The simulation tool can render or simulate the developer's application in an inner frame, while providing an outer frame with which the application simulated in the inner frame can communicate using a two-way communication protocol. The simulation tool can provide a state machine or state engine executing in a third iframe that shows the current state and next state of the application.

As applications become increasingly complex and have various features that are state-dependent, it can be challenging to debug the applications in order to identify and remedy errors, bugs, malfunctions, or other issues that can cause the application to function in an undesired or inefficient manner. For example, an application configured with a voice-based conversational application programming interface ("API") that leverages natural language processing techniques to interface with an end user may have various states, generate responses or generate queries. The application can execute or interface with various different digital assistant surfaces, such as a speaker-based digital assistant, smartphone based digital assistant, television based digital assistant, smartwatch based digital assistant, automotive based digital assistant, or other application or surface. Each surface can interact differently or provide different functions. Due to the variety of surfaces via which the digital assistant-based application can interface or execute, it can be challenging to simulate the digital-assistant based application to identify any bugs or errors in a surface, or to determine whether the digital assistant application operates in a similar, uniform or consistent manner across the different surfaces.

Thus, systems and methods of the present technical solution can provide i) a two-way communication protocol; ii) a state machine; and iii) iframe communications. The simulation tool can allow developers to simulate aspects of their digital assistant-based applications. The state machine can be configured to generate queries/responses, and iframes can be configured to communicate with one another. An iframe can refer to an inline frame. An iframe can be an HTML (hypertext markup language) element that allows an external webpage to be embedded in an HTML document. iframes can be inserted anywhere within a webpage layout.

A developer of an application can develop the application using an application development engine, and then provide a transcript file (e.g., an HTML file with the developer's content). The simulation tool can simulate features of the application and provide a dynamic real-time interface via an inner iframe of the webpage layout. The simulation tool can generate the inner iframe and load the content of the application in the inner iframe. The simulation tool can create an outer iframe that provides controls. The simulation tool can create a third iframe with a state machine. The iframes can communicate with one another, thereby providing a simulation tool having dynamic interactions using iframes. The simulation tool supports this functionality on the web, and is uniform across devices or digital assistant surfaces. The simulation tool can be used to simulate/mimic the behavior of the digital assistant-enabled applications on various devices.

For example, a developer can create an application for building to-do lists. The developer can provide the digital assistant server (e.g., data processing system) with an HTML file with content. The digital assistant can present an iframe with a hook to the simulation tool. The simulation tool can use a 2-way communication protocol, a state machine to synchronize aspects of the conversational or operational flow, and the state machine to generate queries or responses. Thus, the developer can validate or verify that their application is functioning as expected on one or more different types of devices or digital assistant surfaces.

FIG. 1 illustrates an example system 100 to route packetized actions via a computer network. The system 100 can include content selection infrastructure. The system 100 can include a data processing system 102. The data processing system 102 can communicate with one or more of a content provider computing device 106, service provider computing device 108, or client computing device 104 via a network 105. The network 105 can include computer networks such as the Internet, local, wide, metro, or other area networks, intranets, satellite networks, and other communication networks such as voice or data mobile telephone networks. The network 105 can be used to access information resources such as web pages, web sites, domain names, or uniform resource locators that can be presented, output, rendered, or displayed on at least one computing device 104, such as a laptop, desktop, tablet, personal digital assistant, smart phone, portable computers, or speaker. For example, via the network 105 a user of the computing device 104 can access information or data provided by a service provider 108 or content provider 106. The computing device 104 may or may not include a display; for example, the computing device may include limited types of user interfaces, such as a microphone and speaker. In some cases, the primary user interface of the computing device 104 may be a microphone and speaker.

The network 105 can include or constitute a display network, e.g., a subset of information resources available on the internet that are associated with a content placement or search engine results system, or that are eligible to include third party digital components as part of a digital component placement campaign. The network 105 can be used by the data processing system 102 to access information resources such as web pages, web sites, domain names, or uniform resource locators that can be presented, output, rendered, or displayed by the client computing device 104. For example, via the network 105 a user of the client computing device 104 can access information or data provided by the content provider computing device 106 or the service provider computing device 108.

The network 105 may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. The network 105 may include a wireless link, such as an infrared channel or satellite band. The topology of the network 105 may include a bus, star, or ring network topology. The network may include mobile telephone networks using any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). Different types of data may be transmitted via different protocols, or the same types of data may be transmitted via different protocols.

The system 100 can include at least one data processing system 102. The data processing system 102 can include at least one logic device such as a computing device having a processor to communicate via the network 105, for example with the computing device 104, the content provider device 106 (content provider 106), or the service provider device 108 (or service provider 108). The data processing system 102 can include at least one computation resource, server, processor or memory. For example, the data processing system 102 can include a plurality of computation resources or servers located in at least one data center. The data processing system 102 can include multiple, logically-grouped servers and facilitate distributed computing techniques. The logical group of servers may be referred to as a data center, server farm or a machine farm. The servers can also be geographically dispersed. A data center or machine farm may be administered as a single entity, or the machine farm can include a plurality of machine farms. The servers within each machine farm can be heterogeneous—one or more of the servers or machines can operate according to one or more type of operating system platform.

Servers in the machine farm can be stored in high-density rack systems, along with associated storage systems, and located in an enterprise data center. For example, consolidating the servers in this way may improve system manageability, data security, the physical security of the system, and system performance by locating servers and high performance storage systems on localized high performance networks. Centralization of all or some of the data processing system 102 components, including servers and storage systems, and coupling them with advanced system management tools allows more efficient use of server resources, which saves power and processing requirements and reduces bandwidth usage.

The system 100 can include, access, or otherwise interact with at least one service provider device 108. The service provider device 108 can include at least one logic device such as a computing device having a processor to communicate via the network 105, for example with the computing device 104, the data processing system 102, or the content provider 106. The service provider device 108 can include at least one computation resource, server, processor or memory. For example, service provider device 108 can include a plurality of computation resources or servers located in at least one data center. The service provider device 108 can include one or more component or functionality of the data processing system 102.

The content provider computing device 106 can provide audio based digital components for display by the client computing device 104 as an audio output digital component. The digital component can include an offer for a good or service, such as a voice based message that states: "Would you like me to order you a taxi?" For example, the content provider computing device 155 can include memory to store a series of audio digital components that can be provided in response to a voice based query. The content provider computing device 106 can also provide audio based digital components (or other digital components) to the data processing system 102 where they can be stored in the data repository 124. The data processing system 102 can select the audio digital components and provide (or instruct the content provider computing device 106 to provide) the audio digital components to the client computing device 104. The audio based digital components can be exclusively audio or can be combined with text, image, or video data.

The service provider device 108 can include, interface, or otherwise communicate with at least one service provider natural language processor component 142 and a service provider interface 144. The service provider computing device 108 can include at least one service provider natural language processor (NLP) component 142 and at least one service provider interface 144. The service provider NLP component 142 (or other components such as a direct action API of the service provider computing device 108) can engage with the client computing device 104 (via the data processing system 102 or bypassing the data processing system 102) to create a back-and-forth real-time voice or audio based conversation (e.g., a session) between the client computing device 104 and the service provider computing device 108. The service provider NLP 142 can include one or more function or feature as the NLP component 112 of the data processing system 102. For example, the service provider interface 144 can receive or provide data messages to the direct action API 116 of the data processing system 102. The service provider computing device 108 and the content provider computing device 106 can be associated with the same entity. For example, the content provider computing device 106 can create, store, or make available digital components for a car sharing service, and the service provider computing device 108 can establish a session with the client computing device 104 to arrange for a delivery of a taxi or car of the car share service to pick up the end user of the client computing device 104. The data processing system 102, via the direct action API 116, the NLP component 112 or other components can also establish the session with the client computing device, including or bypassing the service provider computing device 108, to arrange for example for a delivery of a taxi or car of the car share service.

The service provider device 108 can include or refer to a provider of an application. The service provider device 108 can include or refer to an application developer device. The service provider device 108 can be a third-party provider device.

The computing device 104 can include, interface, or otherwise communicate with at least one sensor 134, transducer 136, audio driver 138, or pre-processor 140. The sensor 134 can include, for example, an ambient light sensor, proximity sensor, temperature sensor, accelerometer, gyroscope, motion detector, GPS sensor, location sensor, microphone, or touch sensor. The transducer 136 can include a speaker or a microphone. The audio driver 138 can provide a software interface to the hardware transducer 136. The audio driver can execute the audio file or other instructions provided by the data processing system 102 to control the transducer 136 to generate a corresponding acoustic wave or sound wave. The pre-processor 140 can be configured to detect a keyword and perform an action based on the keyword. The pre-processor 140 can filter out one or more terms or modify the terms prior to transmitting the terms to the data processing system 102 for further processing. The pre-processor 140 can convert the analog audio signals detected by the microphone into a digital audio signal, and transmit one or more data packets carrying the digital audio signal to the data processing system 102 via the network 105. In some cases, the pre-processor 140 can transmit data packets carrying some or all of the input audio signal responsive to detecting an instruction to perform such transmission. The instruction can include, for example, a trigger keyword or other keyword or approval to transmit data packets comprising the input audio signal to the data processing system 102.

The client computing device 104 can be associated with an end user that enters voice queries as audio input into the client computing device 104 (via the sensor 134) and receives audio output in the form of a computer generated voice that can be provided from the data processing system 102 (or the content provider computing device 106 or the service provider computing device 108) to the client computing device 104, output from the transducer 136 (e.g., a speaker). The computer generated voice can include recordings from a real person or computer generated language.

The data repository 124 can include one or more local or distributed databases, and can include a database management system. The data repository 124 can include computer data storage or memory and can store one or more parameters 126, one or more policies 128, content data 130, or templates 132 among other data. The parameters 126, policies 128, and templates 132 can include information such as rules about a voice based session between the client computing device 104 and the data processing system 102 (or the service provider computing device 108). The content data 130 can include digital components for audio output or associated metadata, as well as input audio messages that can be part of one or more communication sessions with the client computing device 104.

The data processing system 102 can include a content placement system having at least one computation resource or server. The data processing system 102 can include, interface, or otherwise communicate with at least one interface 110. The data processing system 102 can include, interface, or otherwise communicate with at least one natural language processor component 112. The data processing system 102 can include, interface, or otherwise communicate with at least one direct action application programming interface ("API") 116. The data processing system 102 can include, interface, or otherwise communicate with at least one session handler 114. The data processing system 102 can include, interface, or otherwise communicate with at least one content selector component 118. The data processing system 102 can include, interface, or otherwise communicate with at least one audio signal generator 122. The data processing system 102 can include, interface, or otherwise communicate with at least one simulator component 146. The data processing system 102 can include, interface, or otherwise communicate with at least one controller component 148. The data processing system 102 can include, interface, or otherwise communicate with at least one state machine component 150. The data processing system 102 can include, interface, or otherwise communicate with at least one sandbox environment 152.

The data processing system 102 can include, interface, or otherwise communicate with at least one data repository 124. The at least one data repository 124 can include or store, in one or more data structures or databases, parameters 126, policies 128, content data 130, or templates 132. Parameters 126 can include, for example, thresholds, distances, time intervals, durations, scores, or weights. Content data 130 can include, for example, content campaign information, content groups, content selection criteria, digital component objects or other information provided by a content provider 106 or obtained or determined by the data processing system to facilitate content selection. The content data 130 can include, for example, historical performance of a content campaign.

The interface 110, natural language processor component 112, session handler 114, direct action API 116, content selector component 118, audio signal generator component 122, simulator component 146, controller component 148, state machine component 150, or sandbox environment 152 can each include at least one processing unit or other logic device such as programmable logic array engine, or module configured to communicate with the database repository or database 124. The interface 110, natural language processor component 112, session handler 114, direct action API 116, content selector component 118, audio signal generator component 122, simulator component 146, controller component 148, state machine component 150, sandbox environment 152 and data repository 124 can be separate components, a single component, or part of the data processing system 102. The system 100 and its components, such as a data processing system 102, can include hardware elements, such as one or more processors, logic devices, or circuits.

The data processing system 102 can obtain anonymous computer network activity information associated with a plurality of computing devices 104. A user of a computing device 104 can affirmatively authorize the data processing system 102 to obtain network activity information corresponding to the user's computing device 104. For example, the data processing system 102 can prompt the user of the computing device 104 for consent to obtain one or more types of network activity information. The identity of the user of the computing device 104 can remain anonymous and the computing device 104 can be associated with a unique identifier (e.g., a unique identifier for the user or the computing device provided by the data processing system or a user of the computing device). The data processing system can associate each observation with a corresponding unique identifier.

A content provider 106 can establish an electronic content campaign. The electronic content campaign can be stored as content data 130 in data repository 124. An electronic content campaign can refer to one or more content groups that correspond to a common theme. A content campaign can include a hierarchical data structure that includes content groups, digital component data objects, and content selection criteria. To create a content campaign, content provider 106 can specify values for campaign level parameters of the content campaign. The campaign level parameters can include, for example, a campaign name, a preferred content network for placing digital component objects, a value of resources to be used for the content campaign, start and end dates for the content campaign, a duration for the content campaign, a schedule for digital component object placements, language, geographical locations, type of computing devices on which to provide digital component objects. In some cases, an impression can refer to when a digital component object is fetched from its source (e.g., data processing system 102 or content provider 106), and is countable. In some cases, due to the possibility of click fraud, robotic activity can be filtered and excluded, as an impression. Thus, in some cases, an impression can refer to a measurement of responses from a Web server to a page request from a browser, which is filtered from robotic activity and error codes, and is recorded at a point as close as possible to opportunity to render the digital component object for display on the computing device 104. In some cases, an impression can refer to a viewable or audible impression; e.g., the digital component object is at least partially (e.g., 20%, 30%, 30%, 40%, 50%, 60%, 70%, or more) viewable on a display device of the client computing device 104, or audible via a speaker 136 of the computing device 104. A click or selection can refer to a user interaction with the digital component object, such as a voice response to an audible impression, a mouse-click, touch interaction, gesture, shake, audio interaction, or keyboard click. A conversion can refer to a user taking a desired action with respect to the digital component objection; e.g., purchasing a product or service, completing a survey, visiting a physical store corresponding to the digital component, or completing an electronic transaction.

The content provider 106 can further establish one or more content groups for a content campaign. A content group includes one or more digital component objects and corresponding content selection criteria, such as keywords, words, terms, phrases, geographic locations, type of computing device, time of day, interest, topic, or vertical. Content groups under the same content campaign can share the same campaign level parameters, but may have tailored specifications for particular content group level parameters, such as keywords, negative keywords (e.g., that block placement of the digital component in the presence of the negative keyword on main content), bids for keywords, or parameters associated with the bid or content campaign.

To create a new content group, the content provider can provide values for the content group level parameters of the content group. The content group level parameters include, for example, a content group name or content group theme, and bids for different content placement opportunities (e.g., automatic placement or managed placement) or outcomes (e.g., clicks, impressions, or conversions). A content group name or content group theme can be one or more terms that the content provider 106 can use to capture a topic or subject matter for which digital component objects of the content group is to be selected for display. For example, a car dealership can create a different content group for each brand of vehicle it carries, and may further create a different content group for each model of vehicle it carries. Examples of the content group themes that the car dealership can use include, for example, "Make A sports car" "Make B sports car," "Make C sedan," "Make C truck," "Make C hybrid," or "Make D hybrid." An example content campaign theme can be "hybrid" and include content groups for both "Make C hybrid" and "Make D hybrid", for example.

The content provider 106 can provide one or more keywords and digital component objects to each content group. Keywords can include terms that are relevant to the product or services of associated with or identified by the digital component objects. A keyword can include one or more terms or phrases. For example, the car dealership can include "sports car," "V-6 engine," "four-wheel drive," "fuel efficiency," as keywords for a content group or content campaign. In some cases, negative keywords can be specified by the content provider to avoid, prevent, block, or disable content placement on certain terms or keywords. The content provider can specify a type of matching, such as exact match, phrase match, or broad match, used to select digital component objects.

The content provider 106 can provide one or more keywords to be used by the data processing system 102 to select a digital component object provided by the content provider 106. The content provider 106 can identify one or more keywords to bid on, and further provide bid amounts for various keywords. The content provider 106 can provide additional content selection criteria to be used by the data processing system 102 to select digital component objects. Multiple content providers 106 can bid on the same or different keywords, and the data processing system 102 can run a content selection process or ad auction responsive to receiving an indication of a keyword of an electronic message.

The content provider 106 can provide one or more digital component objects for selection by the data processing system 102. The data processing system 102 (e.g., via content selector component 118) can select the digital component objects when a content placement opportunity becomes available that matches the resource allocation, content schedule, maximum bids, keywords, and other selection criteria specified for the content group. Different types of digital component objects can be included in a content group, such as a voice digital component, audio digital component, content item, a text digital component, an image digital component, video digital component, multimedia digital component, or digital component link. Upon selecting a digital component, the data processing system 102 can transmit the digital component object for rendering on a computing device 104 or display device of the computing device 104. Rendering can include displaying the digital component on a display device, or playing the digital component via a speaker of the computing device 104. The data processing system 102 can provide instructions to a computing device 104 to render the digital component object. The data processing system 102 can instruct the computing device 104, or an audio driver 138 of the computing device 104, to generate audio signals or acoustic waves.

The data processing system 102 can include an interface component 110 designed, configured, constructed, or operational to receive and transmit information using, for example, data packets. The interface 110 can receive and transmit information using one or more protocols, such as a network protocol. The interface 110 can include a hardware interface, software interface, wired interface, or wireless interface. The interface 110 can facilitate translating or formatting data from one format to another format. For example, the interface 110 can include an application programming interface that includes definitions for communicating between various components, such as software components.

The data processing system 102 can include an application, script or program installed at the client computing device 104, such as an app to communicate input audio signals to the interface 110 of the data processing system 102 and to drive components of the client computing device to render output audio signals. The data processing system 102 can receive data packets or other signal that includes or identifies an audio input signal. For example, the data processing system 102 can execute or run the NLP component 112 to receive or obtain the audio signal and parse the audio signal. For example, the NLP component 112 can provide for interactions between a human and a computer. The NLP component 112 can be configured with techniques for understanding natural language and allowing the data processing system 102 to derive meaning from human or natural language input. The NLP component 112 can include or be configured with technique based on machine learning, such as statistical machine learning. The NLP component 112 can utilize decision trees, statistical models, or probabilistic models to parse the input audio signal. The NLP component 112 can perform, for example, functions such as named entity recognition (e.g., given a stream of text, determine which items in the text map to proper names, such as people or places, and what the type of each such name is, such as person, location, or organization), natural language generation (e.g., convert information from computer databases or semantic intents into understandable human language), natural language understanding (e.g., convert text into more formal representations such as first-order logic structures that a computer module can manipulate), machine translation (e.g., automatically translate text from one human language to another), morphological segmentation (e.g., separating words into individual morphemes and identify the class of the morphemes, which can be challenging based on the complexity of the morphology or structure of the words of the language being considered), question answering (e.g., determining an answer to a human-language question, which can be specific or open-ended), semantic processing (e.g., processing that can occur after identifying a word and encoding its meaning in order to relate the identified word to other words with similar meanings).

The NLP component 112 converts the audio input signal into recognized text by comparing the input signal against a stored, representative set of audio waveforms (e.g., in the data repository 124) and choosing the closest matches. The set of audio waveforms can be stored in data repository 124 or other database accessible to the data processing system 102. The representative waveforms are generated across a large set of users, and then may be augmented with speech samples from the user. After the audio signal is converted into recognized text, the NLP component 112 matches the text to words that are associated, for example via training across users or through manual specification, with actions that the data processing system 102 can serve.

The audio input signal can be detected by the sensor 134 or transducer 136 (e.g., a microphone) of the client computing device 104. Via the transducer 136, the audio driver 138, or other components the client computing device 104 can provide the audio input signal to the data processing system 102 (e.g., via the network 105) where it can be received (e.g., by the interface 110) and provided to the NLP component 112 or stored in the data repository 124.

The NLP component 112 can obtain the input audio signal. From the input audio signal, the NLP component 112 can identify at least one request or at least one trigger keyword corresponding to the request. The request can indicate intent or subject matter of the input audio signal. The trigger keyword can indicate a type of action likely to be taken. For example, the NLP component 112 can parse the input audio signal to identify at least one request to leave home for the evening to attend dinner and a movie. The trigger keyword can include at least one word, phrase, root or partial word, or derivative indicating an action to be taken. For example, the trigger keyword "go" or "to go to" from the input audio signal can indicate a need for transport. In this example, the input audio signal (or the identified request) does not directly express an intent for transport, however the trigger keyword indicates that transport is an ancillary action to at least one other action that is indicated by the request. In some cases, the trigger keyword can refer to or include a wakeup word, activation word or keyword that causes the computing device 104 to begin processing the input audio signal.

The NLP component 112 can parse the input audio signal to identify, determine, retrieve, or otherwise obtain the request and the trigger keyword. For instance, the NLP component 112 can apply a semantic processing technique to the input audio signal to identify the trigger keyword or the request. The NLP component 112 can apply the semantic processing technique to the input audio signal to identify a trigger phrase that includes one or more trigger keywords, such as a first trigger keyword and a second trigger keyword. For example, the input audio signal can include the sentence "I need someone to do my laundry and my dry cleaning." The NLP component 112 can apply a semantic processing technique, or other natural language processing technique, to the data packets comprising the sentence to identify trigger phrases "do my laundry" and "do my dry cleaning". The NLP component 112 can further identify multiple trigger keywords, such as laundry, and dry cleaning. For example, the NLP component 112 can determine that the trigger phrase includes the trigger keyword and a second trigger keyword.

The NLP component 112 can filter the input audio signal to identify the trigger keyword. For example, the data packets carrying the input audio signal can include "It would be great if I could get someone that could help me go to the airport", in which case the NLP component 112 can filter out one or more terms as follows: "it", "would", "be", "great", "if", "I", "could", "get", "someone", "that", "could", or "help". By filtering out these terms, the NLP component 112 may more accurately and reliably identify the trigger keywords, such as "go to the airport" and determine that this is a request for a taxi or a ride sharing service.

In some cases, the NLP component can determine that the data packets carrying the input audio signal includes one or more requests. For example, the input audio signal can include the sentence "I need someone to do my laundry and my dry cleaning." The NLP component 112 can determine this is a request for a laundry service and a dry cleaning service. The NLP component 112 can determine this is a single request for a service provider that can provide both laundry services and dry cleaning services. The NLP component 112 can determine that this is two requests; a first request for a service provider that performs laundry services, and a second request for a service provider that provides dry cleaning services. In some cases, the NLP component 112 can combine the multiple determined requests into a single request, and transmit the single request to a service provider device 108. In some cases, the NLP component 112 can transmit the individual requests to respective service provider devices 108, or separately transmit both requests to the same service provider device 108.

The data processing system 102 can include a direct action API 116 designed and constructed to generate, based on the trigger keyword, an action data structure responsive to the request. Processors of the data processing system 102 can invoke the direct action API 116 to execute scripts that generate a data structure to a service provider device 108 to request or order a service or product, such as a car from a car share service. The direct action API 116 can obtain data from the data repository 124, as well as data received with end user consent from the client computing device 104 to determine location, time, user accounts, logistical or other information to allow the service provider device 108 to perform an operation, such as reserve a car from the car share service. Using the direct action API 116, the data processing system 102 can also communicate with the service provider device 108 to complete the conversion by in this example making the car share pick up reservation.

The direct action API 116 can execute a specified action to satisfy the end user's intention, as determined by the data processing system 102. Depending on the action specified in its inputs, the direct action API 116 can execute code or a dialog script that identifies the parameters required to fulfill a user request. Such code can look-up additional information, e.g., in the data repository 124, such as the name of a home automation service, or it can provide audio output for rendering at the client computing device 104 to ask the end user questions such as the intended destination of a requested taxi. The direct action API 116 can determine necessary parameters and can package the information into an action data structure, which can then be sent to another component such as the content selector component 118 or to the service provider computing device 108 to be fulfilled.

The direct action API 116 can receive an instruction or command from the NLP component 112, or other component of the data processing system 102, to generate or construct the action data structure. The direct action API 116 can determine a type of action in order to select a template from the template repository 132 stored in the data repository 124. Types of actions can include, for example, services, products, reservations, or tickets. Types of actions can further include types of services or products. For example, types of services can include car share service, food delivery service, laundry service, maid service, repair services, or household services. Types of products can include, for example, clothes, shoes, toys, electronics, computers, books, or jewelry. Types of reservations can include, for example, dinner reservations or hair salon appointments. Types of tickets can include, for example, movie tickets, sports venue tickets, or flight tickets. In some cases, the types of services, products, reservations or tickets can be categorized based on price, location, type of shipping, availability, or other attributes.

The direct action API 116, upon identifying the type of request, can access the corresponding template from the template repository 132. Templates can include fields in a structured data set that can be populated by the direct action API 116 to further the operation that is requested of the service provider device 108 (such as the operation of sending a taxi to pick up an end user at a pickup location and transport the end user to a destination location). The direct action API 116 can perform a lookup in the template repository 132 to select the template that matches one or more characteristic of the trigger keyword and request. For example, if the request corresponds to a request for a car or ride to a destination, the data processing system 102 can select a car sharing service template. The car sharing service template can include one or more of the following fields: device identifier, pick up location, destination location, number of passengers, or type of service. The direct action API 116 can populate the fields with values. To populate the fields with values, the direct action API 116 can ping, poll or otherwise obtain information from one or more sensors 134 of the computing device 104 or a user interface of the device 104. For example, the direct action API 116 can detect the source location using a location sensor, such as a GPS sensor. The direct action API 116 can obtain further information by submitting a survey, prompt, or query to the end of user of the computing device 104. The direct action API can submit the survey, prompt, or query via interface 110 of the data processing system 102 and a user interface of the computing device 104 (e.g., audio interface, voice-based user interface, display, or touch screen). Thus, the direct action API 116 can select a template for the action data structure based on the trigger keyword or the request, populate one or more fields in the template with information detected by one or more sensors 134 or obtained via a user interface, and generate, create or otherwise construct the action data structure to facilitate performance of an operation by the service provider device 108.

The data processing system 102 can select the template based from the template data structure 132 based on various factors including, for example, one or more of the trigger keyword, request, third party provider device 108, type of third party provider device 108, a category that the third party provider device 108 falls in (e.g., taxi service, laundry service, flower service, or food delivery), location, or other sensor information.

To select the template based on the trigger keyword, the data processing system 102 (e.g., via direct action API 116) can perform a look-up or other query operation on the template database 132 using the trigger keyword to identify a template data structure that maps or otherwise corresponds to the trigger keyword. For example, each template in the template database 132 can be associated with one or more trigger keywords to indicate that the template is configured to generate an action data structure responsive to the trigger keyword that the third party provider device 108 can process to establish a communication session.

In some cases, the data processing system 102 can identify a third party provider device 108 based on the trigger keyword. To identify the third party provider 108 based on the trigger keyword, the data processing system 102 can perform a lookup in the data repository 124 to identify a third party provider device 108 that maps to the trigger keyword. For example, if the trigger keyword includes "ride" or "to go to", then the data processing system 102 (e.g., via direct action API 116) can identify the third party provider device 108 as corresponding to Taxi Service Company A. The data processing system 102 can select the template from the template database 132 using the identify third party provider device 108. For example, the template database 132 can include a mapping or correlation between third party provider devices 108 or entities to templates configured to generate an action data structure responsive to the trigger keyword that the third party provider device 108 can process to establish a communication session. In some cases, the template can be customized for the third party provider device 108 or for a category of third party provider devices 108. The data processing system 102 can generate the action data structure based on the template for the third party provider 108.

To construct or generate the action data structure, the data processing system 102 can identify one or more fields in the selected template to populate with values. The fields can be populated with numerical values, character strings, Unicode values, Boolean logic, binary values, hexadecimal values, identifiers, location coordinates, geographic areas, timestamps, or other values. The fields or the data structure itself can be encrypted or masked to maintain data security.

Upon determining the fields in the template, the data processing system 102 can identify the values for the fields to populate the fields of the template to create the action data structure. The data processing system 102 can obtain, retrieve, determine or otherwise identify the values for the fields by performing a look-up or other query operation on the data repository 124.

In some cases, the data processing system 102 can determine that the information or values for the fields are absent from the data repository 124. The data processing system 102 can determine that the information or values stored in the data repository 124 are out-of-date, stale, or otherwise not suitable for the purpose of constructing the action data structure responsive to the trigger keyword and request identified by the NLP component 112 (e.g., the location of the client computing device 104 may be the old location and not be the current location; an account can be expired; the destination restaurant may have moved to a new location; physical activity information; or mode of transportation).

If the data processing system 102 determines that it does not currently have access, in memory of the data processing system 102, to the values or information for the field of the template, the data processing system 102 can acquire the values or information. The data processing system 102 can acquire or obtain the information by querying or polling one or more available sensors of the client computing device 104, prompting the end user of the client computing device 104 for the information, or accessing an online web-based resource using an HTTP protocol. For example, the data processing system 102 can determine that it does not have the current location of the client computing device 104, which may be a needed field of the template. The data processing system 102 can query the client computing device 104 for the location information. The data processing system 102 can request the client computing device 104 to provide the location information using one or more location sensors 134, such as a Global Positioning System sensor, WIFI triangulation, cell tower triangulation, Bluetooth beacons, IP address, or other location sensing technique.

The direct action API 116 can transmit the action data structure to a third party provider device (e.g., service provider device 108) to cause the third party provider device 108 to invoke a conversational application programming interface (e.g., service provider NLP component 142) and establish a communication session between the third party provider device 108 and the client computing device 104. Responsive to establishing the communication session between the service provider device 108 and the client computing device 1004, the service provider device 108 can transmit data packets directly to the client computing device 104 via network 105. In some cases, the service provider device 108 can transmit data packets to the client computing device 104 via data processing system 102 and network 105.

In some cases, the third party provider device 108 can execute at least a portion of the conversational API 142. For example, the third party provider device 108 can handle certain aspects of the communication session or types of queries. The third party provider device 108 may leverage the NLP component 112 executed by the data processing system 102 to facilitate processing the audio signals associated with the communication session and generating responses to queries. In some cases, the data processing system 102 can include the conversational API 142 configured for the third party provider 108. In some cases, the data processing system routes data packets between the client computing device and the third party provider device to establish the communication session. The data processing system 102 can receive, from the third party provider device 108, an indication that the third party provider device established the communication session with the client device 104. The indication can include an identifier of the client computing device 104, timestamp corresponding to when the communication session was established, or other information associated with the communication session, such as the action data structure associated with the communication session.

In some cases, the conversational API can be a second NLP that includes one or more component or function of the first NLP 112. The second NLP 142 can interact or leverage the first NLP 112. In some cases, the system 100 can include a single NLP 112 executed by the data processing system 102. The single NLP 112 can support both the data processing system 102 and the third party service provider device 108. In some cases, the direct action API 116 generates or constructs an action data structure to facilitate performing a service, and the conversational API generates responses or queries to further a communication session with an end user or obtain additional information to improve or enhance the end user's experience or performance of the service.

The data processing system 102 can include, execute, access, or otherwise communicate with a session handler component 114 to establish a communication session between the client device 104 and the data processing system 102. The communication session can refer to one or more data transmissions between the client device 104 and the data processing system 102 that includes the input audio signal that is detected by a sensor 134 of the client device 104, and the output signal transmitted by the data processing system 102 to the client device 104. The data processing system 102 (e.g., via the session handler component 114) can establish the communication session responsive to receiving the input audio signal. The data processing system 102 can set a duration for the communication session. The data processing system 102 can set a timer or a counter for the duration set for the communication session. Responsive to expiration of the timer, the data processing system 102 can terminate the communication session.

The communication session can refer to a network-based communication session in which the client device 104 provides authenticating information or credentials to establish the session. In some cases, the communication session refers to a topic or a context of audio signals carried by data packets during the session. For example, a first communication session can refer to audio signals transmitted between the client device 104 and the data processing system 102 that are related to (e.g., include keywords, action data structures, or digital component objects) a taxi service; and a second communication session can refer to audio signals transmitted between the client device 104 and data processing system 102 that are related to a laundry and dry cleaning service. In this example, the data processing system 102 can determine that the context of the audio signals are different (e.g., via the NLP component 112), and separate the two sets of audio signals into different communication sessions. The session handler 114 can terminate the first session related to the ride service responsive to identifying one or more audio signals related to the dry cleaning and laundry service. Thus, the data processing system 102 can initiate or establish the second session for the audio signals related to the dry cleaning and laundry service responsive to detecting the context of the audio signals.

The data processing system 102 can include, execute, or otherwise communicate with a content selector component 118 to receive the trigger keyword identified by the natural language processor and select, based on the trigger keyword, a digital component via a real-time content selection process. The content selection process can refer to, or include, selecting sponsored digital component objects provided by third party content providers 106. The real-time content selection process can include a service in which digital components provided by multiple content providers are parsed, processed, weighted, or matched in order to select one or more digital components to provide to the computing device 104. The content selector component 118 can perform the content selection process in real-time. Performing the content selection process in real-time can refer to performing the content selection process responsive to the request for content received via the client computing device 104. The real-time content selection process can be performed (e.g., initiated or completed) within a time interval of receiving the request (e.g., 5 seconds, 10 seconds, 20 seconds, 30 seconds, 1 minute, 2 minutes, 3 minutes, 5 minutes, 10 minutes, or 20 minutes). The real-time content selection process can be performed during a communication session with the client computing device 104, or within a time interval after the communication session is terminated.

For example, the data processing system 102 can include a content selector component 118 designed, constructed, configured or operational to select digital component objects. To select digital components for display in a voice-based environment, the data processing system 102 (e.g., via NLP component 112) can parse the input audio signal to identify keywords (e.g., a trigger keyword), and use the keywords to select a matching digital component based on a broad match, exact match, or phrase match. For example, the content selector component 118 can analyze, parse, or otherwise process subject matter of candidate digital components to determine whether the subject matter of the candidate digital components correspond to the subject matter of the keywords or phrases of the input audio signal detected by the microphone of the client computing device 104. The content selector component 118 may identify, analyze, or recognize voice, audio, terms, characters, text, symbols, or images of the candidate digital components using an image processing technique, character recognition technique, natural language processing technique, or database lookup. The candidate digital components may include metadata indicative of the subject matter of the candidate digital components, in which case the content selector component 118 may process the metadata to determine whether the subject matter of the candidate digital component corresponds to the input audio signal.

Content providers 106 may provide additional indicators when setting up a content campaign that includes digital components. The content provider 106 may provide information at the content campaign or content group level that the content selector component 118 may identify by performing a lookup using information about the candidate digital component. For example, the candidate digital component may include a unique identifier, which may map to a content group, content campaign, or content provider. The content selector component 118 may determine, based on information stored in content campaign data structure in data repository 124, information about the content provider 106.

The data processing system 102 can receive, via a computer network, a request for content for presentation on a computing device 104. The data processing system 102 can identify the request by processing an input audio signal detected by a microphone of the client computing device 104. The request can include selection criteria of the request, such as the device type, location, and a keyword associated with the request. The request can include the action data structure or action data structure.

Responsive to the request, the data processing system 102 can select a digital component object from data repository 124 or a database associated with the content provider 106, and provide the digital component for presentation via the computing device 104 via network 105. The digital component object can be provided by a content provider device 106 different from the service provider device 108. The digital component can correspond to a type of service different from a type of service of the action data structure (e.g., taxi service versus food delivery service). The computing device 104 can interact with the digital component object. The computing device 104 can receive an audio response to the digital component. The computing device 104 can receive an indication to select a hyperlink or other button associated with the digital component object that causes or allows the computing device 104 to identify service provider 108, request a service from the service provider 108, instruct the service provider 108 to perform a service, transmit information to the service provider 108, or otherwise query the service provider device 108.

The data processing system 102 can include, execute, or communicate with an audio signal generator component 122 to generate an output signal. The output signal can include one or more portions. For example, the output signal can include a first portion and a second portion. The first portion of the output signal can correspond to the action data structure. The second portion of the output signal can correspond to the digital component selected by the content selector component 118 during the real-time content selection process.

The audio signal generator component 122 can generate the output signal with a first portion having sound corresponding to the first data structure. For example, the audio signal generator component 122 can generate the first portion of the output signal based on one or more values populated into the fields of the action data structure by the direct action API 116. In a taxi service example, the values for the fields can include, for example, 123 Main Street for pick-up location, 1234 Main Street for destination location, 2 for number of passengers, and economy for the level of service. The audio signal generator component 122 can generate the first portion of the output signal in order to confirm that the end user of the computing device 104 wants to proceed with transmitting the request to the service provider 108. The first portion can include the following output "Would you like to order an economy car from taxi service provider A to pick two people up at 123 Main Street and drop off at 1234 Main Street?"

In some cases, the first portion can include information received from the service provider device 108. The information received from service provider device 108 can be customized or tailored for the action data structure. For example, the data processing system 102 (e.g., via direct action API 116) can transmit the action data structure to the service provider 108 before instructing the service provider 108 to perform the operation. Instead, the data processing system 102 can instruct the service provider device 108 to perform initial or preliminary processing on the action data structure to generate preliminary information about the operation. In the example of the taxi service, the preliminary processing on the action data structure can include identifying available taxis that meet the level of service requirement that are located around the pick-up location, estimating an amount of time for the nearest available taxi to reach the pick-up location, estimating a time of arrival at the destination, and estimating a price for the taxi service. The estimated preliminary values may include a fixed value, an estimate that is subject to change based on various conditions, or a range of values. The service provider device 108 can return the preliminary information to the data processing system 102 or directly to the client computing device 104 via the network 105. The data processing system 102 can incorporate the preliminary results from the service provider device 108 into the output signal, and transmit the output signal to the computing device 104. The output signal can include, for example, "Taxi Service Company A can pick you up at 123 Main Street in 10 minutes, and drop you off at 1234 Main Street by 9 AM for $10. Do you want to order this ride?" This can form the first portion of the output signal.

In some cases, the data processing system 102 can form a second portion of the output signal. The second portion of the output signal can include a digital component selected by the content selector component 118 during a real-time content selection process. The first portion can be different from the second portion. For example, the first portion can include information corresponding to the action data structure that is directly responsive to the data packets carrying the input audio signal detected by the sensor 134 of the client computing device 104, whereas the second portion can include a digital component selected by a content selector component 118 that can be tangentially relevant to the action data structure, or include sponsored content provided by a content provider device 106. For example, the end user of the computing device 104 can request a taxi from Taxi Service Company A. The data processing system 102 can generate the first portion of the output signal to include information about the taxi from the Taxi Service Company A. However, the data processing system 102 can generate the second portion of the output signal to include a digital component selected based on the keywords "taxi service" and information contained in the action data structure that the end user may be interested in. For example, the second portion can include a digital component or information provided by a different taxi service company, such as Taxi Service Company B. While the user may not have specifically requested Taxi Service Company B, the data processing system 102 may nonetheless provide a digital component from Taxi Service Company B because the user may choose to perform an operation with Taxi Service Company B.

The data processing system 102 can transmit information from the action data structure to the Taxi Service Company B to determine a pick-up time, time of arrival at the destination, and a price for the ride. The data processing system 102 can receive this information and generate the second portion of the output signal as follows: "Taxi Service Company B can pick you up at 123 Main Street in 2 minutes, and drop you off at 1234 Main Street by 8:52 AM for $15. Do you want this ride instead?" The end user of computing device 104 can then select the ride provided by Taxi Service Company A or the ride provided by Taxi Service Company B.

Prior to providing, in the second portion of the output signal, the sponsored digital component corresponding to the service provided by Taxi Service Company B, the data processing system 102 can notify the end user computing device that the second portion corresponds to a digital component object selected during a real-time content selection process (e.g., by the content selector component 118). However, the data processing system 102 can have limited access to different types of interfaces to provide the notification to the end user of the computing device 104. For example, the computing device 104 may not include a display device, or the display device may be disabled or turned off. The display device of the computing device 104 may consume greater resources than the speaker of the computing device 104, so it may be less efficient to turn on the display device of the computing device 104 as compared to using the speaker of the computing device 104 to convey the notification. Thus, in some cases, the data processing system 102 can improve the efficiency and effectiveness of information transmission over one or more interfaces or one or more types of computer networks. For example, the data processing system 102 (e.g., via the audio signal generator component 122) can module the portion of the output audio signal comprising the digital component to provide the indication or notification the end user that that portion of the output signal comprises the sponsored digital component.

The data processing system 102 (e.g., via interface 110 and network 105) can transmit data packets comprising the output signal generated by the audio signal generator component 122. The output signal can cause the audio driver component 138 of or executed by the client device 104 to drive a speaker (e.g., transducer 136) of the client device 104 to generate an acoustic wave corresponding to the output signal.

To simulate digital assistant-based application provided by a service provider device 108 or application developer, the data processing system 102 can provide a simulator component 146. The simulator component 146 can be designed, constructed and operational to provide, for display in a web browser, an inner iframe configured to load, in a secure, access restricted computing environment, an application configured to integrate with a digital assistant. The application can be provided by a third-party developer device (e.g., service provider device 108). The simulator component 146 can provide, for display in a web browser, an outer iframe configured with a two-way communication protocol to communicate with the inner iframe. The simulator component 146 can provide a state machine to identify a current state of the application loaded in the inner frame, and load a next state of the application responsive to a control input.

The two-way communication protocol can include, for example, a two-way iframe communication protocol. Messages can be sent to, from or between iframes or a parent frame using the two-way communication protocol. For example, the parent frame can send messages to an iframe using, for example, "iframeE1.contentWindow.postMessage". The parent frame can receive message using, for example, "window.addEventListener('message'). An iframe can send messages to a parent window using, for example, "window.parent.postMessage". An iframe can receive messages using, for example, "window.addEventListener('message'). This postMessage( ) technique can accept parameters, such as message and targetOrigin. The message parameter can include a string or an object that is to be sent to the receiving window. The targetOrigin parameter can include the uniform resource locator ("URL") of the window that the message is being sent to. The protocol, port and hostname of the target window can be set to match this parameter for the message to be sent. Using a wildcard, such as "*" can match any URL.

Two iframes can communicate with one another using the parent frame as a relay. For example, a parent frame (e.g., first frame) can have two child iframes (e.g., second iframe and third iframe). The second iframe can communicate with the parent frame, which can relay the communication to the third iframe. The third iframe can reply to the communication by sending a message back to the parent frame, which can relay the message to the second iframe. Thus, the two-way communication protocol can include the parent frame relaying messages between the second iframe and the third iframe.

The controller component 148 can receive application content. The application content can be provided in a data file, such as an HTML file. The application content can include a transcript file. The transcript file can be provided as an HTML file (hyper text markup language). The transcript file can be provided as in an extensible markup language (XML) file. The controller component 148 can process or parse the content from the developer. The application can be built using a digital assistant application engine. The application can be built using the digital assistant application engine to interface with a digital assistant using audio signals. The digital assistant application engine can refer to a console, software development kit, or application programming interface that is configured to allow a developer to build an application with one or more of hotword or trigger word detection, voice control, or natural language understanding. For example, the digital assistant application engine can refer to a console, software development kit, or application programming interface that is configured to allow a developer to define actions. An action can be built using the engine by mapping an intent to fulfillment. An action can define an entry point to start conversations, along with a unique identifier (which can be referred to as the intent) that maps to a fulfillment that processes the intent. For example, an action can be to purchase goods, check the status of an order, or show a daily deal. An intent can be defined that can be triggered by saying "OK, talk to My Favorite Shoe Store to buy some shoes."

The application can be stored in the data processing system 102, data repository 124 or the simulator component 146. The controller component 148 can be configured to provide input or output controls to the developers when simulating the application. The controller component 148 can be configured to provide settings adjustment to the developer when simulating the application. Adjustable settings can include, for example, a type of surface (e.g., digital assistant surface, mobile surface, television surface, speaker surface, or type of application surface), language, or location. The controller component 148 can provide the loaded application for view in an iframe.

The simulator component 146 can establish one or more iframes. The simulator component 146 can establish the iframes by providing the iframes for display in a web browser that is executed by a computing device 104, service provider device 108, or content provider device 106. Any one of the computing device 104, content provider device 106 or service provider device 108 can be referred to as an application developer device or a device of the application developer. The simulator component 146 can establish an instance of the simulator component 146 in an iframe. The simulator component 146 can establish an instance of the simulator component 146 in a main frame or parent frame that is provided via a web browser. The simulator component 146 can establish a plurality of iframes within the main frame or parent frame (or first frame, or first iframe, or main iframe or parent iframe) that communicate between the plurality of iframes via a two-way communication protocol. The iframes can communicate between each other directly using the two-way communication protocol, or the parent frame can relay the communication between the iframes.

An iframe can refer to an inline frame. An iframe can be an HTML (hypertext markup language) element that allows an external webpage to be embedded in an HTML document. iframes can be inserted anywhere within a webpage layout. The controller component 148 can establish one or more iframes to be generated or presented in a web browser. One or more components or functions of the simulator component 146 can be provided using one more iframes. For example, the simulation tool, controls, application content, or state machine can be provided in one or more iframes. For example, a first iframe can be referred to as a parent iframe that includes the entire simulation tool. In some cases, the first iframe can be a parent frame or main frame that includes one or more child iframes. A second iframe can be referred to as an outer iframe that includes the controls for the simulation. A third iframe can be referred to as an inner iframe that includes the application content. A fourth iframe can include the state machine. For example, the state machine component 150 can execute in, via, or interface with the fourth iframe.

In another example, the simulator component 146 can establish a first iframe for an instance of the simulator component or as a main frame within which multiple iframes can be established. The simulator component 146 can establish or provide a second iframe within the first iframe. The simulator component 146 can establish or provide control settings within the second iframe.

The controller component 148 can provide control settings for display in a web browser. The controller component 148 can provide control settings for display in an iframe. The iframe can be a main frame or a child iframe, such as an iframe within a main frame. For example, a first iframe can be a main iframe for the simulator component 146, and the control settings can be provided for display by the controller component 148 within an iframe (e.g., a second iframe) within the first iframe. The control settings can refer to settings used by the simulator component 146 to simulate the application received from an application developer device (e.g., service provider device 108 or content provider device 106). The control settings can include one or more of a surface, a language, or a location. The simulator component 146 can use these control settings to simulate various aspects of the application. Surface can refer to a type of digital channel, computing device, or user interface. Surfaces can include, for example, mobile computing device, desktop computing device, laptop computing device, or tablet computing device. Surfaces can indicate types of user interfaces or inputs or output available, such as voice-only interface, audio-based interface, display, keyboard, mouse, or touchscreen, for example. Languages can include any spoken or written language, such as English, French, Spanish, Chinese, Hindi, etc. The simulator component 146 can simulate user interface aspects of the application in accordance with the selected language. For example, the simulator component 146 can generate text output for display using the selected language. The simulator component 146 can generate audio output using the selected language. If the simulator component 146 is not configured to generate audio output for a selected language, then the simulator component 146 can determine to default to generating text output for the selected language. If the simulator component 146 is also not configured to generate text output for the selected language, the simulator component 146 can default to generating audio or text output in a language that is similar to the selected language (e.g., if selected language is French, but the application is not configured for French, then default to Spanish) or other default language (e.g., English).

The location control setting can refer to a geographic region, geopolitical boundary, continent, country, state, zip code, or other geographic area. The simulator component 146 can use the location information to simulate aspects of the application, such as notice requirements, search results, currency, or other location or region based information.

The simulator component 146 can establish or provide a third iframe within the first iframe. The simulator component 146 can provide application output via the third iframe, or provide other information associated with the simulation or simulator component. The data processing system 102 can provide output based on an updated state of the state machine. The output can be application output or simulator component 146 output that is provided for display via the third iframe. The simulator component can provide output via the third iframe responsive to loading the transcript file. Loading the transcript file can refer to parsing the transcript file, processing the transcript file, formatting the transcript file, or storing or forwarding the transcript file to one or more other component of the simulator component 146 or data processing system 102 for further processing or simulation.

The simulator component 146 can establish or provide a fourth iframe. The simulator component 146 can establish or provide, within the fourth iframe, a state machine. The state machine can refer to an instance of the state machine component 150. The state machine component 150, or instance thereof, can be executed in the fourth iframe established within the first iframe by the simulator component 146. The data processing system 102 can cause the execution of the state machine within the fourth iframe. The state machine, upon execution, can generate a query based on the transcript file loaded in the second iframe and responsive to the control setting established in the second iframe.

The state machine can be loaded or executed in the fourth iframe. The state machine, or fourth iframe, may have restricted access to computing resources of the device of the application developer. The state machine can execute in a sandboxed computing environment. The data processing system 102 can execute a portion of the state machine. The state machine can be executed entirely in the fourth iframe on the device of the application developer. The state machine can be executed by both the web browser and the data processing system 102. The state machine can execute on the device of the application developer (e.g., 104, 106 or 108) and interface or communicate with the data processing system 102 for one or more processing tasks or data. The data processing system 102 can entirely execute the state machine and provide the output of the state machine for display via the fourth iframe.

The simulator component 146 can load the application in a sandbox computing environment 152. A sandbox computing environment can refer to a portion of memory, a processor, a thread or other computing structure or virtual area that has restricted access to other hardware, software, memory, or function of the data processing system 102. The sandboxed computing environment can be a secure computing environment that is configured to prohibit the application or simulator component 146 from accessing certain functions, ports, or components of the data processing system 102. For example, the application that is being simulated may not be secure or may include errors or bugs. To prevent the application from adversely impacting other functions of the data processing system 102, the data processing system 102 can launch the simulation of the application in the sandboxed computing environment 152.

The simulator component 146 can provide or simulate one or more features of the loaded application. The simulator component 146 can provide a dynamic, real-time interface via the inner iframe. For example, the state machine component 150 can generate queries or responses in accordance with the HTML transcript file for the application. The state machine component 150 can identify a current state and determine a next state based on the current state or an input or output associated with the current state. The state machine component 150 can identify one or more subsequent states. The state machine component 150 can identify or determine the state for a selected digital assistant surface. For example, the controller component 148 can receive a selection of a surface from a plurality of surfaces, and simulate the application via the inner frame based on one or more policies or characteristics associated with the selected surface. For example, the simulator component 146 or instance thereof executing via the one or more iframes can receive, via the control setting of the second iframe, a selection of a surface. The simulator component 146 (or state machine component 150 or instance thereof) can generate the query based on a policy or characteristic for the surface selected via the second iframe. The policy or characteristic can be indicated in the application package file. The policy or characteristic can be stored in the policies data structure 128. The policy can include, for example, to generate a certain type of query based on the type of surface (e.g., conversation query for an audio only user interface; text query for a surface with a display; or search query for a desktop computer).

The simulator component 146 can simulate one or more other component of the data processing system 102, such as the NLP component 112, interface 110, session handler component 114, direct action API 116, audio signal generator component 122 or content selector component 118.

The simulator component 146 can execute the state machine in the iframe to generate a query based on the transcript file and control settings. The simulator component 146 can cause the state machine to provide the query for display. The simulator component 146 can cause the state machine to provide the query for display via the fourth iframe or another iframe. The simulator component 146 can cause the state machine to transmit the query via the two-way communication protocol to another iframe for display or further processing. The simulator component 146 can cause the state machine to provide the generated query for display via the web browser.

The simulator component 146 can receive, responsive to the generated query, an input. For example, the generated query can include a suggested input. The input can correspond to or be responsive to the generated query. The query can state "provide input" or indicate a type of input or content to provide as input. The input can include text or audio input. The input can include audio converted to text. The input can include a request, query, command, instruction, or other data. The simulator component 146 or state machine component 150 can receive an audio signal responsive to the query displayed by the simulator component, and provide the audio signal as the input to the state machine of the fourth iframe.

The simulator component 146 can update a state of the state machine responsive to the query and the input. The simulator component 146 can update a state of the state machine executing in the fourth iframe. The state machine executing in the fourth iframe can update the state. The state machine can process the input and update the state based on one or more of the application, transcript file, or control settings. The simulator component 146 of the data processing system 102 may or may not interface with the state machine executing via the fourth iframe in order to determine the next state or update the state. For example, an instance of the simulator component 146 can execute on via the web browser executing on the device of the application developer (e.g., 104, 106 or 108).

The state machine component 150 (or the instance of the state machine component executing via the iframe of the web browser) can update the state and generate a second query responsive to or based on the input. Updating the state of the state machine can include generating the second query. The second query can be generated or retrieved from the transcript file provided by the application developer. The second query can be generated based on policies, logic, rules, instructions or other data provided via the transcript file. The state machine can generate the second query based on one or more components of the data processing system 102. The state machine can use one or more components of the data processing system 102 to generate the second query or update the state of the state machine.

The simulator component 146, data processing system 102 or other script executing via the web browser can identify, based on the second query generated by the state machine responsive to the input, an error with the application. The error can refer to or indicate an inability to update the state, or the next state being an undesired or incorrect state. The error can refer to or indicate that the state machine was unable to determine the next state or process the input signal. The error can indicate that the application or transcript file may not be configured to handle or process the input. For example, the input can be in a different language from the language provided in the control setting, the application may not be configured to process the language used to provide the input, and may not be configured to handle the exception. The error can indicate that the input included a request for a data file or content that may not be accessible to the application, but the application may not be configured to respond in this instance. The data processing system 102 (or one or more component or instance of such component executing on the device of the application developer via the web browser) can generate an alert indicating the error associated with the application simulated via the simulator component 146

For example, the simulator component 146 can identify or detect an error associated with the application being simulated, and then generate an alert indicating the error. The generation of the alert can facilitate identifying the error or bug in the application. The data processing system 102 can generate a report indicating the error. The data processing system 102 can terminate, responsive to the error, at least one of the plurality of iframes established by the simulator component. The data processing system 102 can automatically remedy the error if the error is due to an issue the data processing system 102 is configured to automatically resolve, such as a typographical error, a common error, or a file linking error.

The data processing system 102 can perform one or more actions responsive to the error. For example, responsive to the error, the data processing system 102 (or component or instance thereof) can block communication between two or more iframes, refresh one or more iframes, remove an iframe, or establish a new instance of an iframe. For example, the data processing system 102 can block further communication between the iframe having the error and other iframes. The data processing system 102 can disable or terminate the communication via the two-way communication protocol used to communicate between the iframes. The data processing system 102 can block, disable, or prevent the communication between the iframe having the error. For example, the data processing system 102 can determine which iframe is associated with the error or caused the error, and prevent that iframe from communicating with the other iframes in order to allow the simulator component to continue with the simulation without disrupting the other components. While blocking one of the iframes from communicating with other iframes may adversely impact the simulation, the simulator component can perform one or more other functions without information from the blocked off iframe. In some cases, the simulator component, responsive to detecting the lack of communication from an iframe or responsive to blocking an iframe, can initiate a new instance of the iframe in order to continue with the simulation.

The data processing system 102 can refresh, responsive to the error, at least one of the plurality of iframes established by the simulator component. The data processing system 102 can determine which iframe caused the error or has crashed, and then refresh that iframe. Refreshing the iframe can include restarting the iframe and providing the same input. Refreshing the iframe can include returning the iframe to the same state immediately prior to the iframe crashing. Refreshing the iframe can include re-loading the iframe to an initial state, and then providing an initial input.

The data processing system 102 can remove, responsive to the error, at least one of the plurality of iframes. The data processing system 102 can close, cancel, terminate, delete or otherwise remove the iframe. The data processing system 102 can establish a new instance of the at least one of the plurality of iframes previously removed. For example, the data processing system 102 can determine which iframe crashed or resulted in the error, remove that iframe, and establish or initiate a new instance of the same iframe. The data processing system 102 can establish the new instance of the iframe with a default state of the iframe such that the simulator component 146 can continue with a new query or restart the simulation with the original query or input. In some cases, if a particular input resulted in the error, then the data processing system 102 can prevent the same input from being entered into the simulation until the developer has updated or fixed the application, thereby preventing further errors or crashes and preventing or reducing wasted computing resource utilization.

The simulator component 146 can provide, in a debug section of the graphical user interface (e.g., Debug section 334 depicted in FIG. 3) information that facilitates the developer working with the outer frame and manage states. The following pseudo code provides example information:

```
"immersiveResponse": {
  "loadImmersiveID": "",
  "loadImmersiveUrl": https://Example.applicationlocation.com/
  "rawHtml": "",
  "updateState": {
    fieldsMap": [
    |
      "fields",
      {
        nullVAlue": 0,
        numberValue": 0,
        "stringValue": "",
        boolVAlue": false,
        structValue": {
          fieldsMap": [
          |
          "data",
          {
              "null Value": 0,
                "numberValue": 0,
              "StringValue": ",
              "boolVAlue": false,
              "structValue": {
              "fieldsMap": [
              |
              "stringVlue",
              {
              null Value": 0,
              "numberValue": 0,
              "string Value":
"\"[{actionType\\\::"Initiale_Chunk\\\",\\\tts\\\Text\\\"; \\\"<speak>\\\\
n<media xml: id\\\\\\\\ "EXAMPLE_INTRO_WELCOME_MUSIC\\\\\\\"
repeatCount ="1"; soundLevel = 0.00dB; fadeInOut = 0 seconds; fadeout
duration = 3 seconds; end = "Intro_Welcome.end-0.3s"; audio source =
https://example_application_audio_file; media - xml.
```

Figure 2:
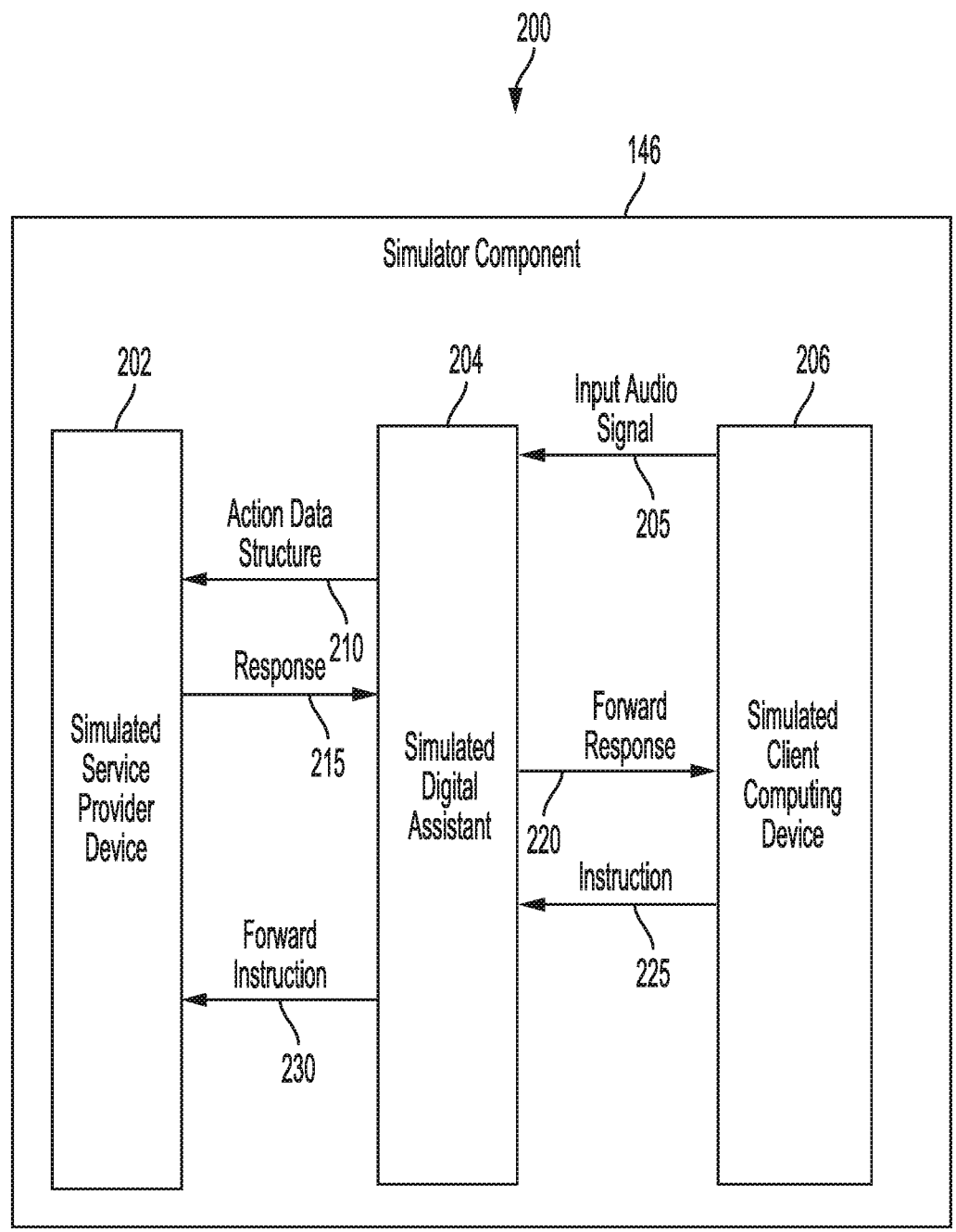
FIG. 2 is an illustration of an operation of a system to simulate digital assistant-based applications.

FIG. 2 is an illustration of the system 100 to simulate a digital assistant-based application. The system can include one or more components of system 100 depicted in FIG. 1. At 205, the simulator component 146 can receive from the simulated client computing device 206 (e.g., simulation of client device 104) data packets carrying the input audio signal detected by a microphone or other sensor of the simulated computing device 206 (or the computing device 104 used by the application developer). The simulator component 146 can receive the input audio signal via the simulator user interface. The data processing system 102 can parse the input audio signal to identify a keyword, request or other information to generate an action data structure responsive to the request.

At ACT 210, simulated digital assistant 204 (e.g., simulator component 146 or portion of data processing system 102) can transmit the action data structure to the simulated service provider device 202 (or third party provider device 108). The simulated digital assistant 204 can transmit the action data structure via a network. The simulated service provider device 202 can include an interface configured to receive and process the action data structure transmitted by the simulated digital assistant 204.

The simulated service provider device 202 (e.g., via a conversational API) can respond to the action data structure at ACT 215. The response from the simulated service provider device 202 can be generated by simulator component 146 (or state machine component 150), and can include an indication of a service to perform corresponding to the action data structure. The response can include a confirmation to proceed with performing the operation. The response can include a request for further information to perform the operation corresponding to the action data structure. For example, the action data structure can be for a ride, and the simulated service provider 202 can respond with a request for further information such as a number of passengers for the ride, a type of car desired by the passenger, desired amenities in the car, or preferred pick up location. The request for additional information can include information that may not be present in the action data structure. For example, the action data structure can include baseline information to perform the operation, such as the pick-up location, destination location, and number of passengers. The baseline information can be the standard data set used by a plurality of service providers 108 within the taxi service category. However, a certain taxi service provider 108 can choose to customize and improve the operation by requesting additional information or preferences from the simulated client computing device 206.

The simulated service provider device 202 can transmit one or more data packets carrying the response to the simulated digital assistant 204 at ACT 215. The simulated digital assistant 204 can parse the data packets and identify a source of the data packets and a destination for the data packets. At ACT 220, the simulated digital assistant 204 can, accordingly, route or forward the data packets to the simulated client computing device 206. The simulated digital assistant 204 can route or forward the data packets via network 105.

At ACT 225, the simulated client computing device 206 can transmit an instruction or command to the simulated digital assistant based on the forwarded response. For example, the response forwarded at 225 can be a request for a number of passengers and a confirmation to proceed with scheduling the taxi ride. The instruction at 225 can include the number of passengers and the instruction to proceed with scheduling the pickup. The simulated client computing device 206 can transmit one or more data packets carrying the instruction to the simulated digital assistant 204. The simulated digital assistant 204 can route or forward the data packets carrying the instructions to the simulated service provider device 202 at ACT 230.

The simulated digital assistant 204 can route or forward the data packets at ACT 220 or ACT 230 as-is (e.g., without manipulating the data packets). The digital assistant 204 can process the data packets to filter out information, or encapsulate the data packets with information to facilitate processing of the data packets by the simulated service provider device 202 or the simulated client computing device 206.

The simulator component 146 can simulate content selection such as via the content selector component 118. The simulator component 146, for example, can simulate selecting content in response to keywords or requests via the simulated application, and present digital components.

Figure 3:
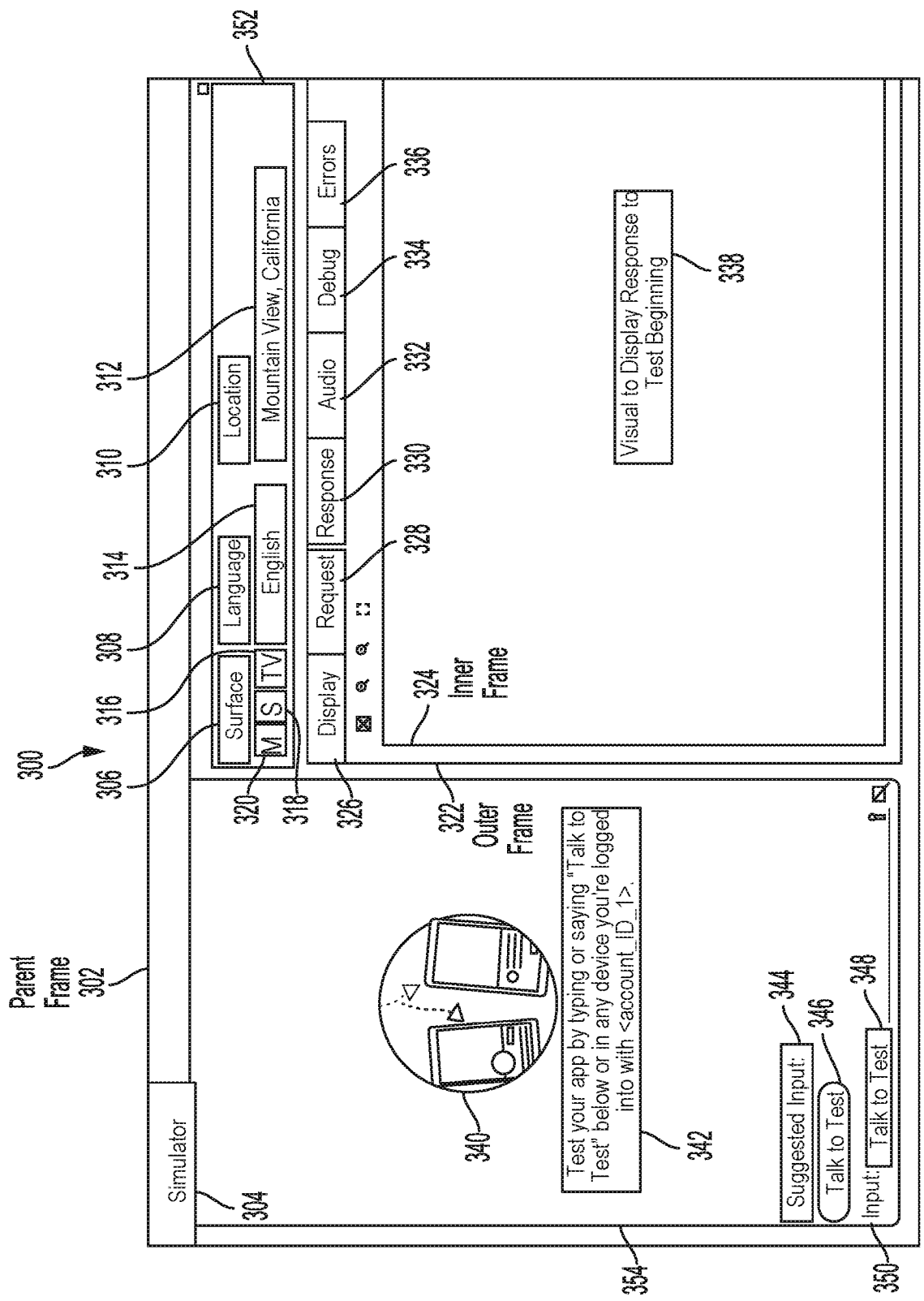
FIG. 3 is an illustration of a graphical user interface of provided by a system to simulate digital assistant-based applications.

FIG. 3 is an illustration of a graphical user interface of provided by a system to simulate digital assistant-based applications. FIG. 3 depicts a basic frame structure system 300 provided by simulator 304 (e.g., simulator component 146). The graphical user interface can be provided by a system that includes one or more component of system 100 depicted in FIG. 1 or system 200 depicted in FIG. 2. The graphical user interface 300 of the simulator tool includes a simulator indicator 304. The GUI 300 includes a parent frame 302. The GUI 300 can be rendered via a web browser or other application configured to execute and present a web page layout. The GUI 300 includes an outer frame 322 and an inner frame 324. The inner frame provides a visual output or prompt using a graphical user interface element. For example, a prompt, popup, notification or other graphical user interface display to test the beginning 338 of the application or simulator 304. The visual can display the response to the test beginning, introduction, or initial screen of the application or simulator 304.

The outer frame 322 provides control buttons or view buttons, such as display 326, request 328, response 330, audio 332, debug 334 and errors 336. The buttons 326, 328, 330, 332, 334 and 336 can include a graphical user interface element, widget, button, drop down menu, toggle, switch, or other graphical user interface element configured to provide output or receive input to facilitate performance of an action or execution of a command. For example, \electing a button, such as errors 336 button can provide a display of identified errors. Selecting the display 326 button, for example, can cause the simulator 304 to display or render for display output provided via the simulator 304. The output can be displayed in the inner frame 324. Selecting the request 328 button, for example, can cause the simulator 304 to generate a request or simulate a request, such as a request for an input or a request for a content item. Selecting the response button 330, for example, can cause the simulator 304 to simulate a response or allow a user to input a response. Selecting the audio 332 button, for example, can signal the simulator 304 to provide audio output or audio input. Selecting the debug 334 button, for example, cause the simulator 304 to perform a debug process. The debug process can include simulating a predetermined sequence of states, or inputs to the simulator 304 or application thereof. The debug process can include entering a debug mode in which the simulator 304 can generate error logs, store error logs, or otherwise provide error logs. Selecting the errors 336 button can, for example, display one or more errors that were logged by the simulator 304.

The parent frame provides settings inputs, such as surface 306, language 308 and location. The parent frame can provide such settings within an iframe 352 that is within the parent frame. The settings can be provided within the iframe 352, which can be referred to as a second iframe 352. The developer can select the type of surface 306, such as mobile phone digital assistant surface 320, speaker digital assistant surface 318, or television digital assistant surface 316. The mobile phone digital assistant surface 320 can refer to a configuration or settings that simulate hardware or software that corresponds to a mobile phone (e.g., a mobile computing device having a display, touchscreen, location sensor, or cellular-based communication capabilities). The speaker digital assistant surface 318 can refer to a configuration or settings that simulate hardware or software that corresponds to a speaker or smart speaker (e.g., a speaker lacking a display device). The television digital assistant surface 316 can refer to a configuration or settings that simulate hardware or software that corresponds to a television or large display that is typically mounted on a wall or placed on a television stand a distance greater than arm's length from the user. The developer can input language 308 as English 314. The developer can input location 310 as Mountain View, Calif. 312.

The simulator 304 (simulator component 146 of data processing system 102) can provide an iframe with the input audio signal input dialog. The simulator 304 can provide an icon 340 that displays an interaction between mobile computing devices. The simulator 304 can provide textual instructions "Test your app by typing or saying "talk test" below or in any device you're logged into with <account_ID_1>." (342). At 344, the simulator 304 provides suggest input of "talk to test" (346). At 348, the input 350 is provided by the developer as "talk to test" (348), in accordance with the input suggested at 344 by the simulator 304. The simulator 304 can simulate, in an iframe 354, the application by loading a state machine in iframe 354. The iframe 354 can execute or provide a state machine. The iframe 354 can be referred to as a fourth iframe.

For example, as illustrated in FIG. 3, the parent frame 302 can be referred to as a first frame or first iframe. The iframe 352 with the control settings can be referred to as a second iframe. The inner iframe 324 can provide application display output and can be referred to as a third iframe. The iframe 354 that executes or provided the state machine can be referred to as the fourth iframe.

Figure 4:
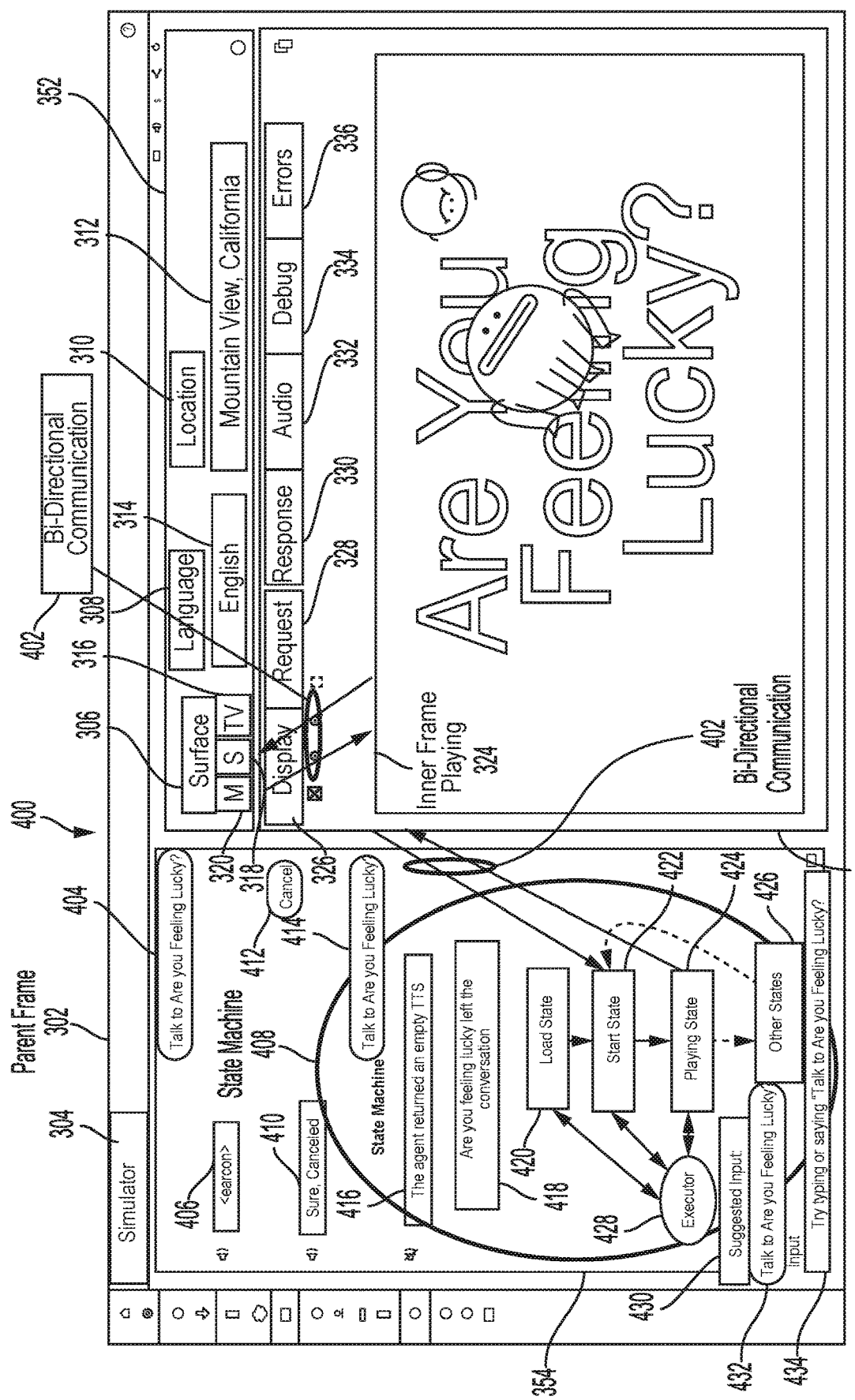
FIG. 4 is an illustration of a graphical user interface of provided by a system to simulate digital assistant-based applications.

FIG. 4 is an illustration of a graphical user interface of provided by a system to simulate digital assistant-based applications. FIG. 4 depicts a detailed frame structure system 400 provided by simulator 304 (e.g., simulator component 146). The graphical user interface can be provided by a system that includes one or more component of system 100 depicted in FIG. 1 or system 200 depicted in FIG. 2 or GUI 300 depicted in FIG. 3. The simulator 304 can provide a bi-directional communication 402 between the inner frame 324 (e.g., the third iframe) playing the application or audio or multimedia clip, and the outer frame 322. The inner frame 324 can be referred to as a third iframe 324. The bi-directional communication 402 allows the inner frame 324 to communicate with the outer frame 322. The bi-directional communication 402 allows the outer frame 322 to track information or data associated with the display 326, requests 328, responses 330, audio 332, debugger 334 and errors 336. The simulator 304 can provide control settings in iframe 352 (e.g., a second iframe). The iframe 352 can be within or a part of the outer iframe 322.

The simulator 304 can provide a dialog window. At 404, the dialog window includes a query input by the developer or user of the simulator 406 by an input audio or text input: "talk to are you feeling lucky?". At 406, the dialog window illustrates an <earcon>. An Earcon can refer to a beeping when an error occurs or other sound indicating a startup, shutdown, or other event associated with the application playing in the inner frame 324. This earcon can reflect the simulator 304 indicating an error associated with the application playing in the inner frame 324. At 412, the developer or user inputs an input audio or textual command "cancel".

At 410, the simulator 304 simulating the application in the inner frame 324 outputs "Sure, Canceled". At 414, the developer again inputs by input audio or text input the same query at 404, which is "talk to are you feeling luck?".

The simulator 304 can load, execute, establish or otherwise provide the state machine via iframe 354 (e.g., fourth iframe). The state machine 408 can determine a current state and load subsequent states. At 416, the simulator 304 (e.g., via state machine 408) responds with an empty text to speech. At 418, the simulator 304 (e.g., via state machine 408) indicates that "are you feeling lucky left the conversation". At 420, the state machine 408 can load state and communicate with an executor; at 422 the state machine 408 can start state and communicate with executor 428. At 424, the state machine can be in a playing state 424. The executor 424 can refer to or include the controller component 148 and be configured to execute, launch, initiate, or cause the simulator 304 to enter a state. The state machine can include other states 426 provided by the application, and the state machine 408 can loop back to a start state 422.

At 430, the dialog indicates suggested input of "Talk to are you feeling lucky?" (432), which was entered at 404 and 414. At 434, the simulator 304 indicates "try typing or saying "talk to are you feeling lucky?".

Figure 5:
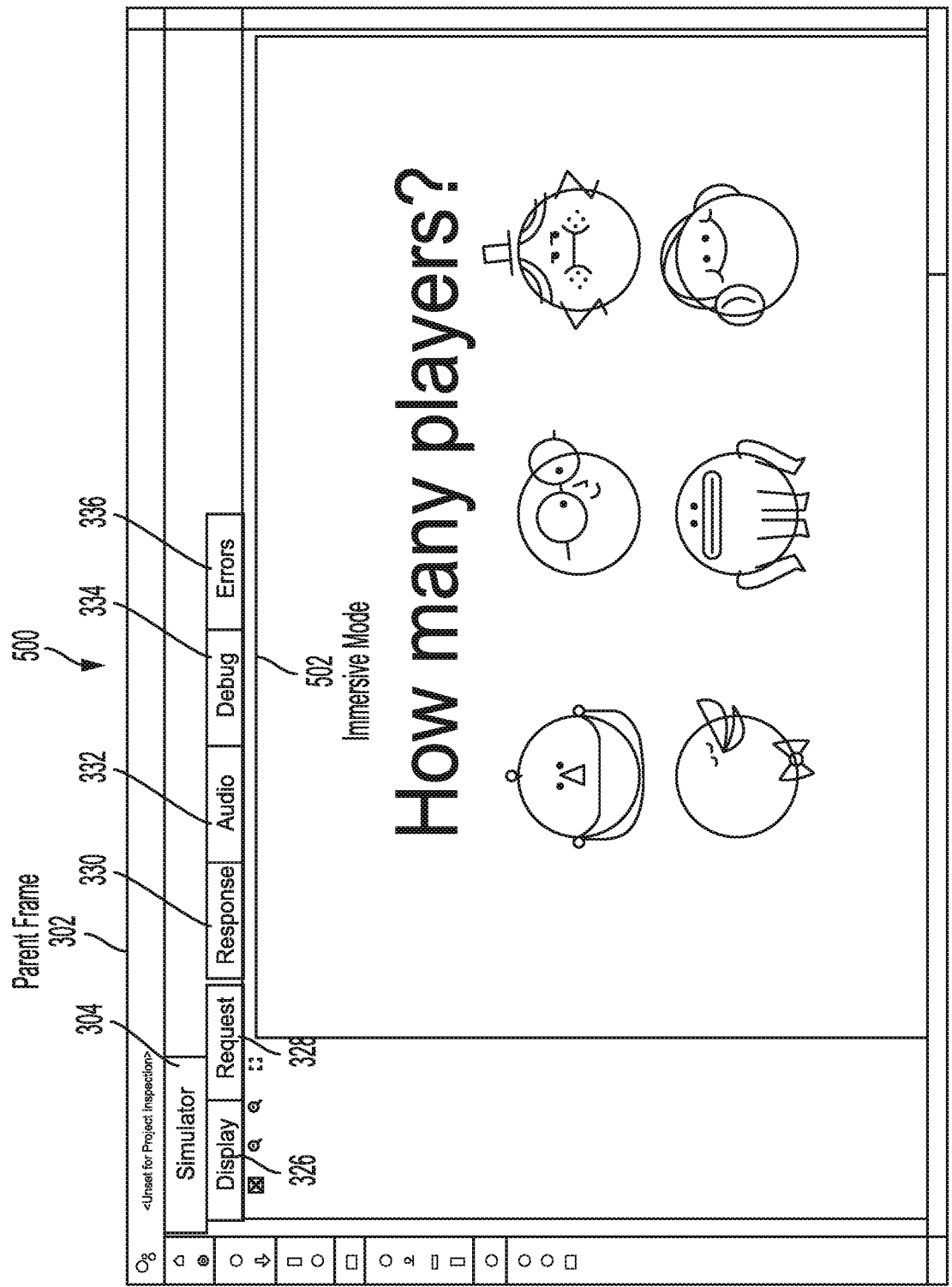
FIG. 5 is an illustration of a graphical user interface of provided by a system to simulate digital assistant-based applications.

FIG. 5 is an illustration of a graphical user interface of provided by a system to simulate digital assistant-based applications. The graphical user interface can be provided by a system that includes one or more component of system 100 depicted in FIG. 1 or system 200 depicted in FIG. 2 or system 300 depicted in FIG. 3 or system 400 depicted in FIG. 4. FIG. 5 depicts an immersive mode for immersive response system 500. The parent frame 302 can include the simulator 304 and the outer frame control buttons display 326, request 328, response 330, audio 332 debug 334 and errors 336. The immersive mode 502 can include the simulation of the application, which can include a multimedia output.

Figure 6:
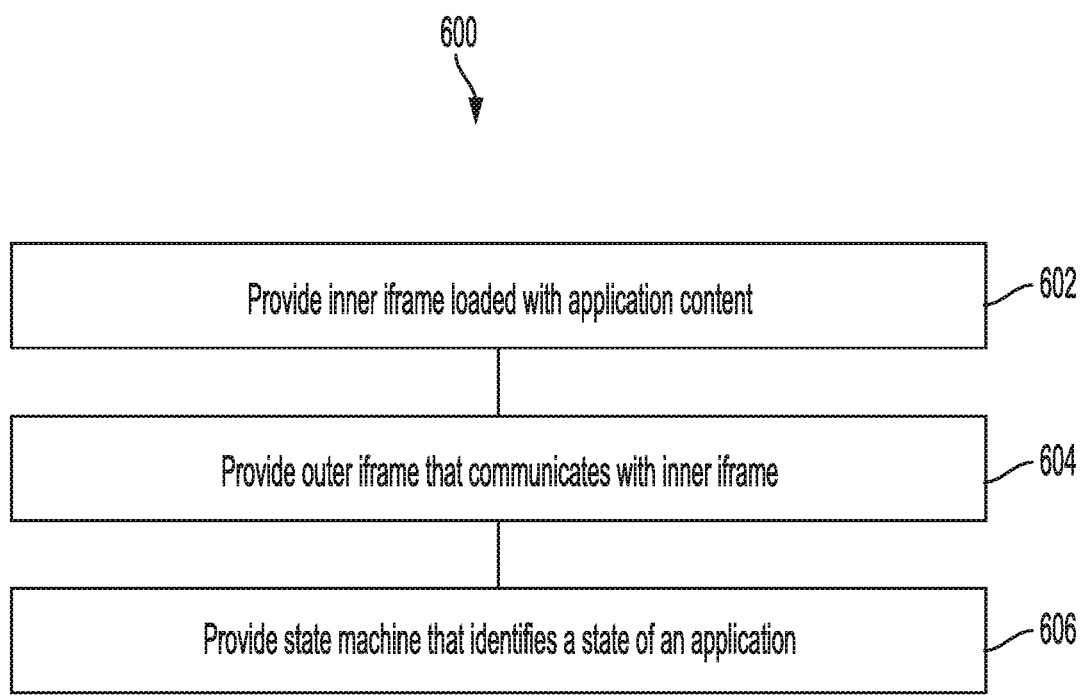
FIG. 6 is an illustration of a method of simulating digital assistant-based applications.

FIG. 6 is an illustration of an example method for performing dynamic modulation of packetized audio signals. The method 600 can be performed by one or more component, system or element of system 100, 200, 300, 400 or 500, including, for example a data processing system 102 or simulator component 146. At ACT 602, the data processing system can provide an inner frame loaded with application content. The inner frame can load the application. Application content can be provided via an HTML file with a transcript. The data processing system can provide, for display in a web browser, an inner iframe configured to load, in a secure, access restricted computing environment, an application configured to integrate with a digital assistant. The application can be provided by a third-party developer device.

At ACT 604, the data processing system can provide an outer frame that communicates with the inner frame. The inner and outer frames can communicate with one another using a bi-directional or two-way communication protocol. For example, the two iframes can communicate by using the parent iframe as a relay for messages. The parent iframe and the outer frame and inner frame can be on the same domain, in which case the inner iframe and outer iframe can communicate using the parent iframe as a relay, thereby establishing a bi-directional communication channel. The two-way communication channel can be coded or configured in javascript. Thus, the data processing system can provide, for display in the web browser, an outer iframe configured with a two-way communication protocol to communicate with the inner iframe.

At ACT 606, the data processing system can provide a state machine that identifies, determines or indicates the state of an application. The data processing system can provide a state machine to identify a current state of the application loaded in the inner frame, and load a next state of the application responsive to a control input.

Figure 7:
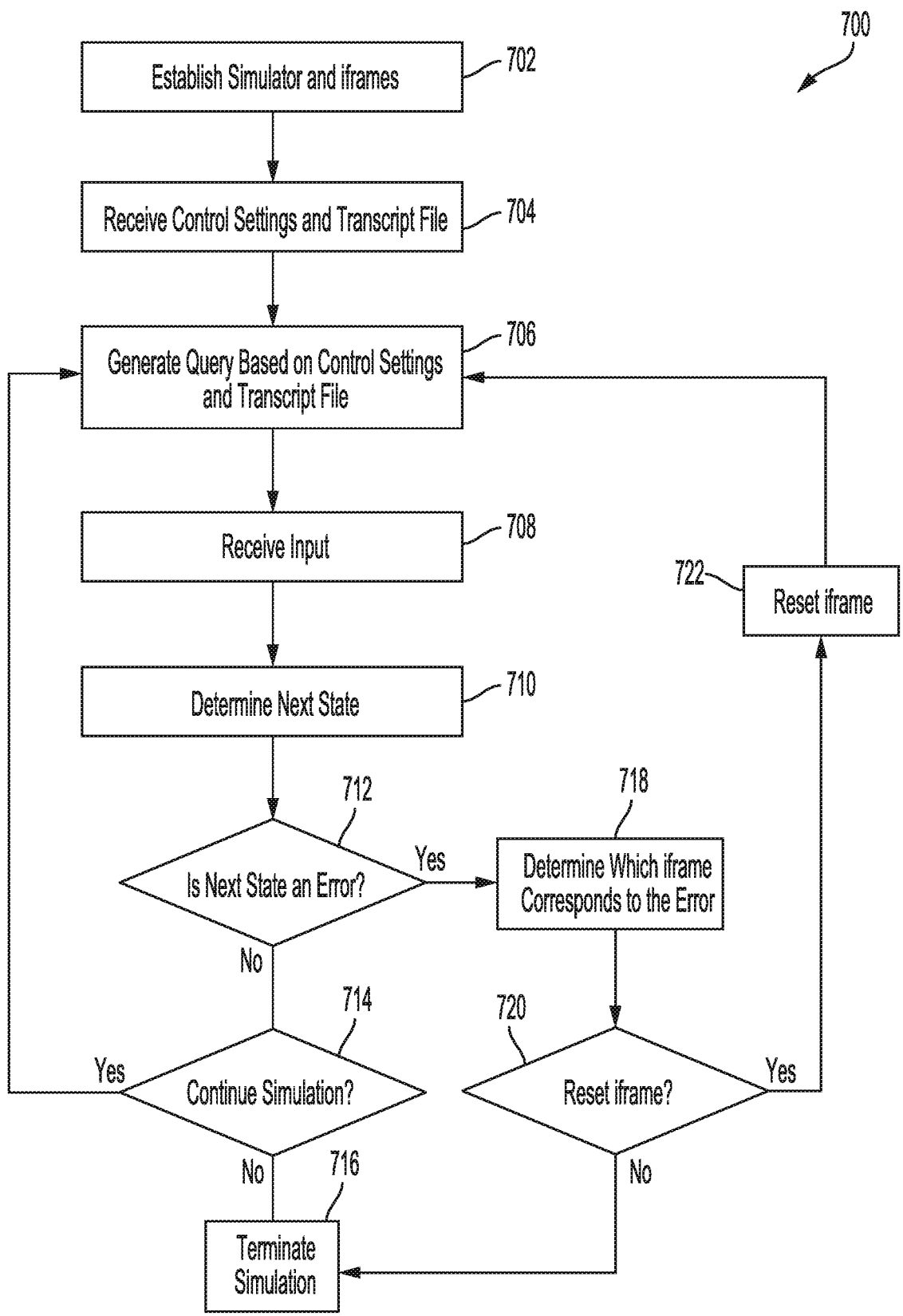
FIG. 7 is an illustration of a flow chart of a method of simulating digital assistant-based applications.

FIG. 7 is an illustration of a flow chart of a method of simulating digital assistant-based applications. The method 700 can be performed by one or more system or component depicted in FIGS. 1, 2 and 8, or the graphical user interfaces depicted in FIGS. 3-5. For example, the method 700 can be performed by a data processing system, simulator component, controller component, or state machine component. At ACT 702, the data processing system can establish a simulator and iframes. The data processing system can establish the simulator component and iframes via a device of an application developer. The data processing system can provide the simulator component, or data files, for execution or rendering on the device of the application developer. The data processing system can provide the simulator component for rending or execution by a web browser, or other application, that is executed by the device of the application developer.

The simulator component, upon execution on the device of the application developer, can generate one or more iframes. For example, the simulator component can establish a first iframe that is a main iframe or parent iframe. Within the main iframe, the simulator component can establish a second iframe. The second iframe can be a child iframe. The second iframe can inherit one or more properties of the parent iframe. The second iframe can execute, load, display, or otherwise provide control settings to be used by the simulator component to simulate the application. The simulator component, upon execution, can establish a third iframe within the first iframe. The third iframe can be a child iframe and inherit one or more properties of the parent iframe. The third iframe can provide application output, simulated application output, or simulator component output. The application or simulation output can be provided responsive to loading the transcript file. The transcript file can be provided by the application developer. The transcript file can be provided by the application developer as input to the simulator component or the state machine of a fourth iframe.

The simulator component can establish a fourth iframe within the first iframe or main iframe. The simulator component can establish the fourth iframe as a child iframe that can inherit one or more properties of the main iframe. The fourth iframe can execute, load, display, or otherwise provide a state machine. The state machine can refer to an instance of the state machine component provided by the data processing system.

The data processing system can receive control settings and a transcript file at ACT 704. The data processing system can receive the control settings and the transcript via the one or more iframes established at ACT 702. For example, the second iframe can provide a graphical user interface to allow an application developer to input or select control settings. The third iframe can provide application output or an output of the simulated application. The third iframe can provide application output based on a state machine or a transcript file. The transcript file can be provided by the application developer and used by the simulator component to simulate the application output. In the event that there are multiple transcript files that can be executed or used for the simulation, the application developer can select one of them.

At ACT 706, the data processing system can generate a query based on the control settings and the transcript file received at ACT 704. The data processing system can generate a suggested query. The data processing system can display or provide the query as an output for display, or as an audio output. The data processing system can generate the query using the state machine associated with the fourth iframe. The data processing system can use a two-way communication protocol established between the iframes to obtain and provide information to facilitate the generation of the query.

At ACT 708, the data processing system can receive input. The data processing system can receive input responsive to the generated query. The input can be responsive to the query. The input can include text input or audio input. The input can include voice input. The input can include the query generated at ACT 706. The input can include a query that is different from the query generated at ACT 706. The input can include a request, command, or instruction.

The data processing system can determine a next state at ACT 710. The data processing system can determine the next state based on processing the input received at ACT 708. The data processing system can determine the next state using a state machine. The data processing system can determine the next state based on the control settings and transcript file received at ACT 704.

At ACT 712, the data processing system can evaluate the next state determined at ACT 710. The data processing system can determine whether the next state is an error. The data processing system can determine whether a next state was determined at ACT 710. If a next state was not determined at ACT 710, then the data processing system can detect an error at ACT 712. The data processing system can detect the error at ACT 712 based on comparing the simulated next state at ACT 710 with an expected next state. For example, if the simulated next state is to direct the user to a news website, but the input query was to play music, then the data processing system can determine an error. In another example, if the simulated next state is to play music, but the input was a request to purchase shoes, then the data processing system can detect an error. In another example, if the input was to play music, but the simulated next state indicates that the application does not have access to the requested music and the application crashes rather than provide for exception handling, then the data processing system can determine an error.

If the data processing system determines at ACT 712 that there was no error or the next state was not in error, then the data processing system can proceed to decision block 714. At decision block 714, the data processing system can determine whether to continue the simulation, or not continue the simulation. If the data processing system determines, at decision block 714, to continue the simulation, the data processing system can return to ACT 706 to generate the next query. The data processing system can generate the next query based on the control settings, transcript file, input previously received at ACT 708, or the state previously determined at 710.

If, however, at ACT 712, the data processing system determines or detects an error in an iframe or the generated next state, the data processing system can proceed to ACT 718. At ACT 718, the data processing system can determine which iframe corresponds to the detected error. For example, the data processing system can determine whether the error is associated with the iframe executing the state machine, the iframe that provides the control settings, the iframe that loaded the transcript file, or some other iframe or component.

The data processing system can identify the iframes using a numeric identifier, alphanumeric identifier, unique identifier, or other identifier. The data processing system can provide or assign an identifier to each of the iframes upon creating the iframes. The data processing system can use default identifiers for each iframe.

Upon determining which iframe is associated with or corresponds the error at ACT 718, the data processing system can determine whether to reset the iframe at decision block 720. Resetting the iframe can refer to or include refreshing the iframe, removing the iframe and initiating a new instance of the iframe, restarting the iframe, replacing the iframe, or otherwise performing an action on the iframe in an attempt to resolve the error associated with the iframe in order to continue with the simulation. The data processing system can use a policy to determine whether to reset the iframe. The data processing system can prompt the developer via another iframe or popup window as to whether or not to reset the iframe or terminate the simulation. The data processing system can automatically determine whether to reset the iframe or what type of reset action to perform based on one or more factors. For example, the data processing system can use a counter to determine whether or not to reset the iframe. If this is the first occurrence of an error or a certain type of error, then the data processing system can determine to reset the iframe and attempt to continue with the simulation. If the number of errors, or the number of same or similar errors, occur a threshold number of times (e.g., 2, 3, 4, 5 or more), then the data processing system can determine to not reset the iframe and proceed to ACT 716 to terminate the simulation.

However, if the data processing system determines at decision block 720 to proceed with resetting the frame, the data processing system can reset the frame at ACT 722. After resetting the iframe at ACT 722, the data processing system can return to ACT 706 to generate a query based on the control settings and transcript file. The data processing system can generate the same query and repeat in order to recreate the same set of conditions that led to the error, or generate a new query in order to cause a new input to be provided, thereby circumventing the error.

In summary, the systems and methods of the present disclosure allow for or provide testing of digital assistant-based applications. The application to be tested is executed within the simulator component 146. More specifically, the application may be executed within a sandbox environment 152 (e.g., a virtual machine) of the simulator component 146. The simulator component 146 simulates a real hardware device (also known as a surface) on which the application may be deployed. For example, the inner frame 324 can show the output that the application would generate, if the application were to be executed on a surface. Continuing this example, the dimensions of the inner frame 324 may be adjusted to represent the dimensions of different surfaces' display screens, thereby allowing the application's compatibility with different surfaces to be tested. Alternatively or in addition, the inner frame 324 can display a visual representation of an audio output that the application would generate. Thus, the present disclosure allows a digital assistant-based application to be tested to identify errors that may occur if the application were to be executed on a surface. Advantageously, testing can occur within a web browser, thereby eliminating the need for the application to be tested with different types of surface.

The state machine component 150 of the simulator component 146 acts as an interface between the application being tested and a service provider device 108 or a simulated service provider device 202. For example, the state machine component 150 can send commands, queries or other instructions and/or data to the application, thereby allowing the functionality of the application to be tested. The transcript file may include the commands, queries or other instructions and/or data that the state machine component 150 sends to the application. The state machine component 150 may also receive an output from the application, and may forward that output to the service provider device 108 or the simulated service provider device 202.

The application may be deployed on a surface, or deployed on the simulator component 146, via an application package file. The application package file includes the application itself. The application package file may optionally further include other instructions and/or data to allow the application to be installed and/or executed.

Figure 8:
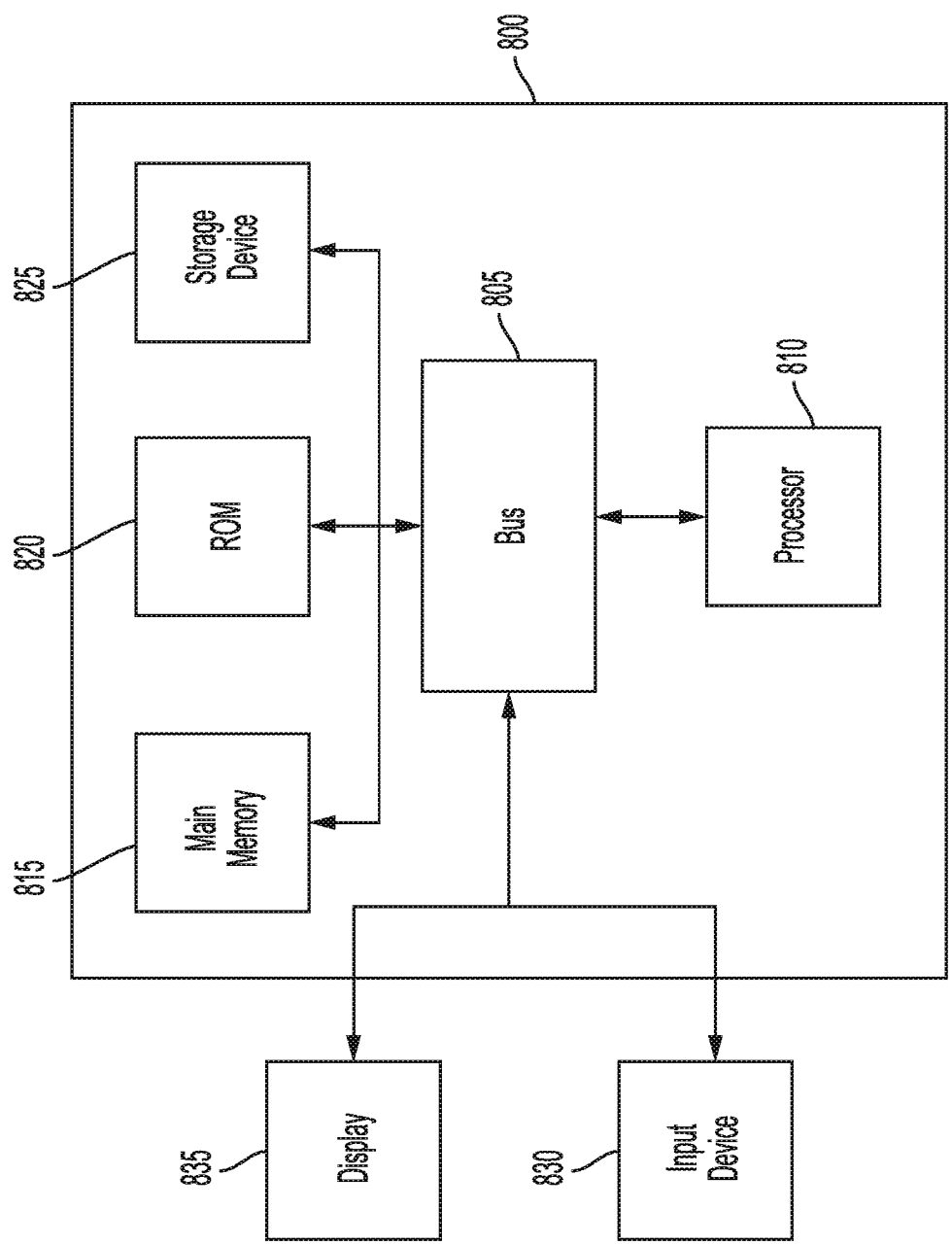
FIG. 8 is a block diagram illustrating a general architecture for a computer system that can be employed to implement elements of the systems and methods described and illustrated herein, including, for example, the systems depicted in FIGS. 1 and 2, the graphical user interfaces depicted in FIGS. 3-5, and the method depicted in FIG. 7.

FIG. 8 is a block diagram of an example computer system 800. The computer system or computing device 800 can include or be used to implement the system 100, or its components such as the data processing system 102. The data processing system 102 can include an intelligent personal assistant or voice-based digital assistant. The computing system 800 includes a bus 805 or other communication component for communicating information and a processor 810 or processing circuit coupled to the bus 805 for processing information. The computing system 800 can also include one or more processors 810 or processing circuits coupled to the bus for processing information. The computing system 800 also includes main memory 815, such as a random access memory (RAM) or other dynamic storage device, coupled to the bus 805 for storing information, and instructions to be executed by the processor 810. The main memory 815 can be or include the data repository 124. The main memory 815 can also be used for storing position information, temporary variables, or other intermediate information during execution of instructions by the processor 810. The computing system 800 may further include a read only memory (ROM) 820 or other static storage device coupled to the bus 805 for storing static information and instructions for the processor 810. A storage device 825, such as a solid state device, magnetic disk or optical disk, can be coupled to the bus 805 to persistently store information and instructions. The storage device 825 can include or be part of the data repository 124.

The computing system 800 may be coupled via the bus 805 to a display 835, such as a liquid crystal display, or active matrix display, for displaying information to a user. An input device 830, such as a keyboard including alphanumeric and other keys, may be coupled to the bus 805 for communicating information and command selections to the processor 810. The input device 830 can include a touch screen display 835. The input device 830 can also include a cursor control, such as a mouse, a trackball, or cursor direction keys, for communicating direction information and command selections to the processor 810 and for controlling cursor movement on the display 835. The display 835 can be part of the data processing system 102, the client computing device 104 or other component of FIG. 1, for example.

The processes, systems and methods described herein can be implemented by the computing system 800 in response to the processor 810 executing an arrangement of instructions contained in main memory 815. Such instructions can be read into main memory 815 from another computer-readable medium, such as the storage device 825. Execution of the arrangement of instructions contained in main memory 815 causes the computing system 800 to perform the illustrative processes described herein. One or more processors in a multi-processing arrangement may also be employed to execute the instructions contained in main memory 815. Hard-wired circuitry can be used in place of or in combination with software instructions together with the systems and methods described herein. Systems and methods described herein are not limited to any specific combination of hardware circuitry and software.

Although an example computing system has been described in FIG. 8, the subject matter including the operations described in this specification can be implemented in other types of digital electronic circuitry, or in computer software, firmware, or hardware, including the structures disclosed in this specification and their structural equivalents, or in combinations of one or more of them.

For situations in which the systems discussed herein collect personal information about users, or may make use of personal information, the users may be provided with an opportunity to control whether programs or features that may collect personal information (e.g., information about a user's social network, social actions or activities, a user's preferences, or a user's location), or to control whether or how to receive content from a content server or other data processing system that may be more relevant to the user. In addition, certain data may be anonymized in one or more ways before it is stored or used, so that personally identifiable information is removed when generating parameters. For example, a user's identity may be anonymized so that no personally identifiable information can be determined for the user, or a user's geographic location may be generalized where location information is obtained (such as to a city, postal code, or state level), so that a particular location of a user cannot be determined. Thus, the user may have control over how information is collected about him or her and used by the content server.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "data processing system" "computing device" "component" or "data processing apparatus" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. For example, the direct action API 116, content selector component 118, or NLP component 112 and other data processing system 102 components can include or share one or more data processing apparatuses, systems, computing devices, or processors.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the data processing system 102) to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as system 100 or system 800 can include clients and servers. A client and server are generally remote from each other and typically interact through a communication network (e.g., the network 165). The relationship of client and server arises by virtue of computer programs running on the respective computers and having a client-server relationship to each other. In some implementations, a server transmits data (e.g., data packets representing a digital component) to a client device (e.g., for purposes of displaying data to and receiving user input from a user interacting with the client device). Data generated at the client device (e.g., a result of the user interaction) can be received from the client device at the server (e.g., received by the data processing system 102 from the computing device 104 or the content provider computing device 106 or the service provider computing device 108).

While operations are depicted in the drawings in a particular order, such operations are not required to be performed in the particular order shown or in sequential order, and all illustrated operations are not required to be performed. Actions described herein can be performed in a different order.

The separation of various system components does not require separation in all implementations, and the described program components can be included in a single hardware or software product. For example, the NLP component 112 or the content selector component 118, can be a single component, app, or program, or a logic device having one or more processing circuits, or part of one or more servers of the data processing system 102.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A system to detect errors in digital assistant-based applications, comprising:
  a data processing system comprising one or more processors to:
  identify an application package file for an application, provided by an application developer, that interfaces with a digital assistant via audio signals;
  receive, from a device of the application developer, a transcript file for the application;
  establish, in a web browser executed by the device of the application developer, a first iframe of a simulator component for digital assistant-based applications, the simulator component to establish a plurality of iframes within the first iframe that communicate between the plurality of iframes via a two-way communication protocol;
  provide, for display in the web browser executed by the device of the application developer, a second iframe within the first iframe to load a control setting for the simulator component;
  provide, for display in the web browser, a third iframe within the first iframe to display output of the simulator component;
  provide, for display in the web browser, a fourth iframe within the first iframe to execute a state machine to generate a query based on the transcript file and responsive to the control setting established in the second iframe;

the simulator component to:
provide, via the fourth iframe, the query for display via the web browser;
receive, responsive to the query, an input including a content item request;
update a state of the state machine responsive to the query and the input to generate an application output, the application output including a digital component responsive to the content item request for display via the third iframe;
identify, based on a second query generated by the state machine responsive to the input, an error with the application; and
terminate, responsive to the error, at least one of the plurality of iframes established by the simulator component.

2. The system of claim 1, comprising the simulator component to simulate content selection including selection of at least one digital component that includes an audio component.

3. The system of claim 1, comprising the simulator component to simulate content selection as part of a digital component placement campaign.

4. The system of claim 1, wherein the content item request includes a request for audio content.

5. The system of claim 1, wherein the application output includes audio content.

6. The system of claim 1, wherein the fourth iframe has restricted access to computing resources of the device of the application developer.

7. The system of claim 1, comprising the data processing system to execute the state machine provided via the fourth iframe.

8. The system of claim 1, comprising the data processing system to:
receive an audio signal responsive to the query displayed by the simulator component; and
provide the audio signal as the input to the state machine of the fourth iframe.

9. The system of claim 1, wherein the application is built by the application developer via a digital assistant application engine provided by the data processing system.

10. The system claim 1, comprising:
the data processing system to load, in the second iframe, the control setting comprising at least one of a surface, a language, or a location.

11. The system of claim 1, comprising:
the data processing system to receive, from the device of the application developer, a hypertext markup language ("HTML") file comprising the transcript file.

12. The system of claim 1, comprising:
the data processing system to simulate one or more features of the application and provide a dynamic, real-time interface via at least one of the plurality of iframes.

13. The system of claim 1, comprising the data processing system to:
receive, via the control setting of the second iframe, a selection of a surface from a plurality of surfaces; and
generate the query based on a policy or characteristic for the surface selected via the second iframe.

14. The system of claim 1, comprising:
the data processing system to generate an alert indicating the error associated with the application simulated via the simulator component.

15. The system of claim 1, comprising:
the data processing system to block, responsive to the error, further communication between at least two of the plurality of iframes established by the simulator component.

16. The system of claim 1, comprising:
the data processing system to refresh, responsive to the error, at least one of the plurality of iframes established by the simulator component.

17. The system of claim 1, comprising the data processing system to:
remove, responsive to the error, at least one of the plurality of iframes; and
establish a new instance of the at least one of the plurality of iframes previously removed.

18. A method of detecting errors in digital assistant-based applications, comprising:
identifying, by a data processing system comprising one or more processors and memory, an application package file for an application, provided by an application developer, that interfaces with a digital assistant via audio signals;
receiving, by the data processing system from a device of the application developer, a transcript file for the application;
establishing, by the data processing system in a web browser executed by the device of the application developer, a first iframe of a simulator component for digital assistant-based applications, the simulator component to establish a plurality of iframes within the first iframe that communicate between the plurality of iframes via a two-way communication protocol;
providing, by the data processing system for display in the web browser executed by the device of the application developer, a second iframe within the first iframe to load a control setting for the simulator component;
providing, by the data processing system for display in the web browser, a third iframe within the first iframe to display output of the simulator component;
providing, by the data processing system for display in the web browser, a fourth iframe within the first iframe that executes a state machine to generate a query based on the transcript file and responsive to the control setting established in the second iframe;
providing, via the fourth iframe, the query for display via the web browser;
receiving, responsive to the query, an input including a content item request;
updating a state of the state machine responsive to the query and the input to generate an application output for display via the third iframe, the application output including a digital component responsive to the content item request;
identifying, based on a second query generated by the state machine responsive to the input, an error with the application; and
terminating, responsive to the error, at least one of the plurality of iframes established by the simulator component.

19. The method of claim 18, wherein the fourth iframe has restricted access to computing resources of the device of the application developer.

20. The method of claim 18, comprising:
receiving an audio signal responsive to the query displayed by the simulator component; and
providing the audio signal as the input to the state machine of the fourth iframe.

* * * * *